United States Patent [19]
Mantini et al.

[11] Patent Number: 5,959,365
[45] Date of Patent: Sep. 28, 1999

[54] EARLY WARNING DEVICE FOR TIRE RIMS AND HUB ASSEMBLIES

[76] Inventors: John Mantini, R.R. #2, Line 4, Lot 169; Ken Adams, R.R. #2, Line 4, Lot 106, both of Niagara on the Lake, Ontario, Canada, L0S 1I0; Sam Chia, 86 Parnell Road, St. Catharines, Ontario, Canada, L2N 2W8

[21] Appl. No.: 09/022,537

[22] Filed: Feb. 12, 1998

[30] Foreign Application Priority Data

Mar. 11, 1997 [CA] Canada .................................... 2199649

[51] Int. Cl.⁶ ....................................................... B60T 8/88
[52] U.S. Cl. ......................... 307/10.1; 180/197; 180/290; 340/440; 701/124
[58] Field of Search .......................... 307/10.1; 180/171, 180/197, 290; 340/425.5, 431, 438; 303/122; 701/29, 124

[56] References Cited

U.S. PATENT DOCUMENTS

| | | | |
|---|---|---|---|
| 4,952,908 | 8/1990 | Sanner | 340/440 |
| 4,964,679 | 10/1990 | Rath | 180/171 |
| 5,032,821 | 7/1991 | Domanico et al. | 701/124 |
| 5,458,404 | 10/1995 | Fennel et al. | 303/122 |
| 5,791,441 | 8/1998 | Matos et al. | 188/1.11 L |

*Primary Examiner*—Albert W. Paladini

[57] ABSTRACT

The present invention relates to an apparatus to provide a monitoring device for detecting problems associated with the wheels of trucks and trailers. The apparatus comprises one or more individual axle spindle sensors, a programmable micro processor for receiving and processing the sensor signals to detect an alarm condition and alarm means to alert the driver of a problem with one or more of the wheels.

38 Claims, 36 Drawing Sheets

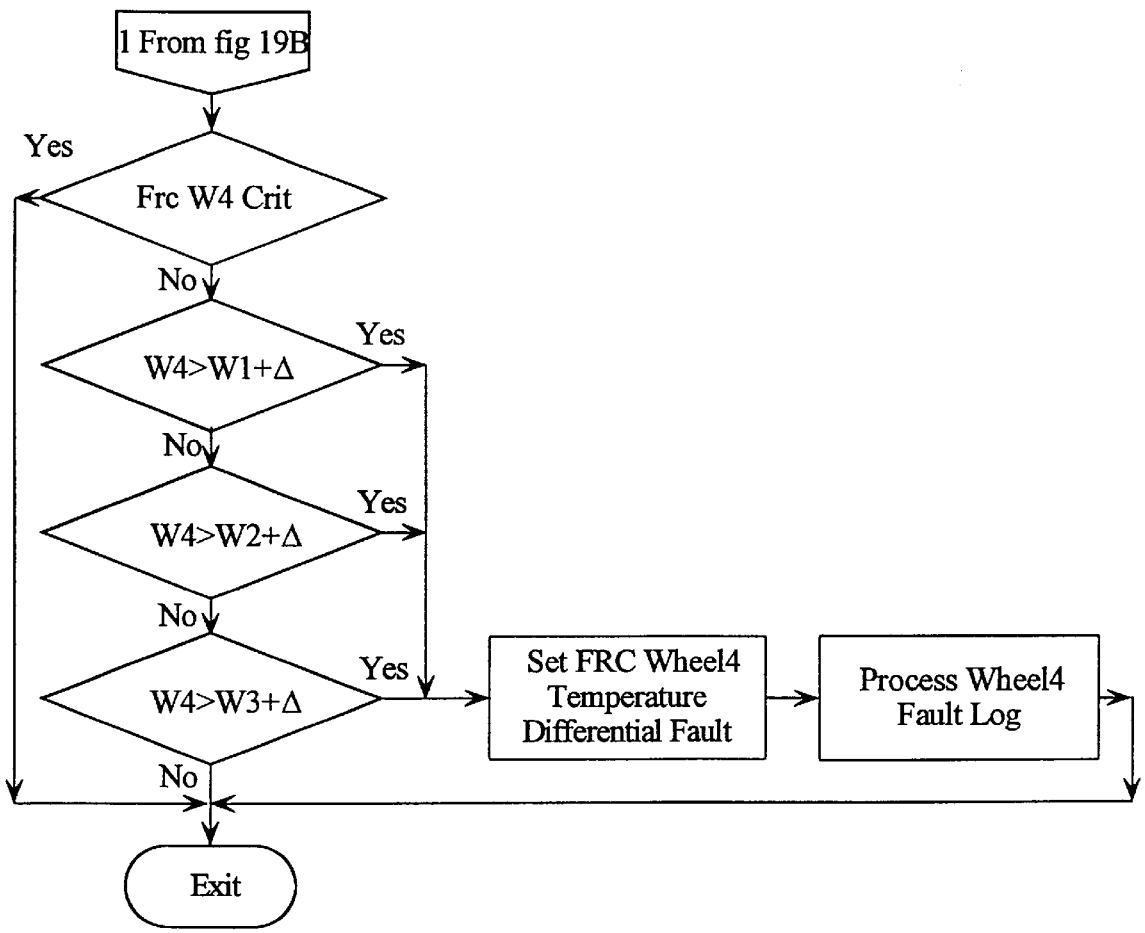

EARLY WARNING DEVICE FOR TIRE RIMS AND HUB ASSEMBLIES

BACKGROUND OF THE INVENTION

This invention relates to apparatus to detect a problem prior to the random detachment of the tire rims and/or complete or partial wheel hub assemblies of vehicles particularity heavy highway transport vehicles. In particular the present invention provides a networked microcontroller based system that monitors and records all operating axle faults for multi axle vehicles including a cab and trailer(s) hookup.

DESCRIPTION OF THE PRIOR ART

The safety of heavy highway transport vehicles has been a serious problem with an increase in the number of accidents and even fatalities caused by tire rims or complete or partial wheel hub assemblies becoming detached from heavy vehicles particulaily trucks or trailers and hitting passenger vehicles. The regulatory authorities have instituted spot checks to identify vehicles that are not being properly maintained and public concern has increased as a high percentage of the vehicles inspected have defects of one type or another. Even those vehicles that are properly maintained, can experience random detachment of tire rims or complete wheel hub assemblies if an oil seal breaks.

The main reason for the detachment of tire rims and wheel hub assemblies is due to the overheating of wheel bearings due to a lack of lubricant and/or improper bearing load. Knocking caused by improper bearing pre-load, a cracked bearing case, loose wheel nuts, broken studs and cracked rims is also an indication of possible imminent detachment. There is a need for a system to effectively detect these problems so that they can be corrected before the tire rim or wheel hub assembly becomes detached.

SUMMARY OF THE INVENTION

It is an object of the invention to provide an early warning system to detect a problem prior to the random detachment of the tire rims and/or wheel hub assemblies of vehicles, particularity heavy highway transport vehicles.

It is a further object of the invention to provide an early warning system that utilizes a networked microcontroller based system that monitors and records all operating axle faults for a multi axle vehicle including a cab and trailer(s) hookup.

It is a further object of the invention to provide an early warning system that gives an audio and visual signal when a problem is detected.

It is a further object of the invention to provide an early warning system that continuously monitors the effects of heat, noise, vibration and knocking on wheel bearing and brakes.

Thus in accordance with the present invention there is provided a monitoring device for detecting problems associated with the wheels of multi axle vehicles comprising one or more individual axle spindle sensors, a programmable micro processor for receiving and processing the sensor signals to detect an alarm condition and alarm means to alert the driver of a problem with one or more of the wheels. In the preferred embodiment the sensors detect heat, noise, vibration or knocking associated with the wheels and brakes. Typically the sensors are located on the axle within the wheel hub and brake pads. The processor monitors changes in the heat, noise and vibration of the wheel bearins, wheel assembly and brakes detected by the sensors and determines when an alarm condition exists.

In accordance with another embodiment the present invention provides a networked microcontroller based system for monitoring and recording operating axle faults for a multi axle vehicle where each of the axles on the vehicle has wheels and brakes at both ends of the axles. The system includes sensors capable of monitoring heat, noise, vibration and shocks associated with the axles, brakes and wheels mounted on each axle. One or more sensor CPUs are connected to the sensors monitoring the axles and wheels and brakes. One or more fault recording CPUs are connected to the sensor CPUs. One of the fault recording CPUs has a keypad and display for system initialization and when a fault is detected, a fault warning means alerts the operator of the vehicle.

In accordance with another embodiment., the present invention provides a networked microcontroller based system for monitoring and recording operating axle faults for vehicles including a cab and one or more trailers, where said cab has at least two cab axles with wheels and brakes at both ends of said cab axles and said trailer has one or more trailer axles with wheels and brakes at both ends of said trailer axles. The system comprises a series of sensors capable of monitoring heat, noise, vibration and shocks associated with said axles, brakes and wheels mounted on each cab axle and each trailer axle, one or more cab sensor CPUs connected to the sensors monitoring the cab axles and wheels and brakes, one or more trailer sensor CPUs connected to the sensors monitoring the trailer axles and wheels and brakes, a cab fault recording CPU connected to said cab sensor CPUs, a trailer fault recording CPU connected to said trailer sensor CPUs, said cab fault recording CPU having a keypad and display for system initialization and fault warning and means to permit the cab fault recording CPU and trailer fault recording CPU to communicate with each other. The means to permit the cab fault recording CPU and trailer fault recording CPU to communicate with each other preferably consists of a multiplex bus.

In another embodiment of the invention a communication system for tractor trailers is provided comprising a cab CPU incorporating a transmitter/receiver and a trailer CPU incorporating a transmitter receiver wherein the cab CPU and the trailer CPU communicate with each other on a multiplex bus. The multiplex bus uses a circuit on the standard seven pin connection preferably a free turn signal lamp wire for transmitting and receiving data. The cab CPU is programmable to control or monitor one or more auxilary functions on the trailer. These auxilary functions are unlimited and include for example in-cab warning lights in response to a signal from the trailer to the cab if there is an antilocking brake system (ABS) malfunction on the trailer. In addition the system can be programmed so that the operator can control from the cab: lift axle operation, operate rear door locks, operate emergency stop warning lights on the trailer, operate tail gates, hoppers, valves and chutes, operate back up lights and horn on the trailer. The operator can also from the cab monitor: drive shaft overheating, brake adjustment on the trailer, brake pad wear, trailer refridgeration units, load shift or weight of the trailer and the like.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

The early warning system of the present invention is designed to detect a problem which may result in tire rims or complete or partial wheel hub assemblies becoming detached from a vehicle, such as a truck or trailer, and hitting passenger vehicles. The main reason for the detachment of tire rims or wheel hub assemblies is due to the overheating of wheel bearings due to a lack of lubricant and/or improper bearing load. Knocking, vibration and noise caused by improper bearing pre-load cracked bearing case, loose wheel nuts, broken studs or cracked rims can also be an indication of imminent detachment.

Figure 1:
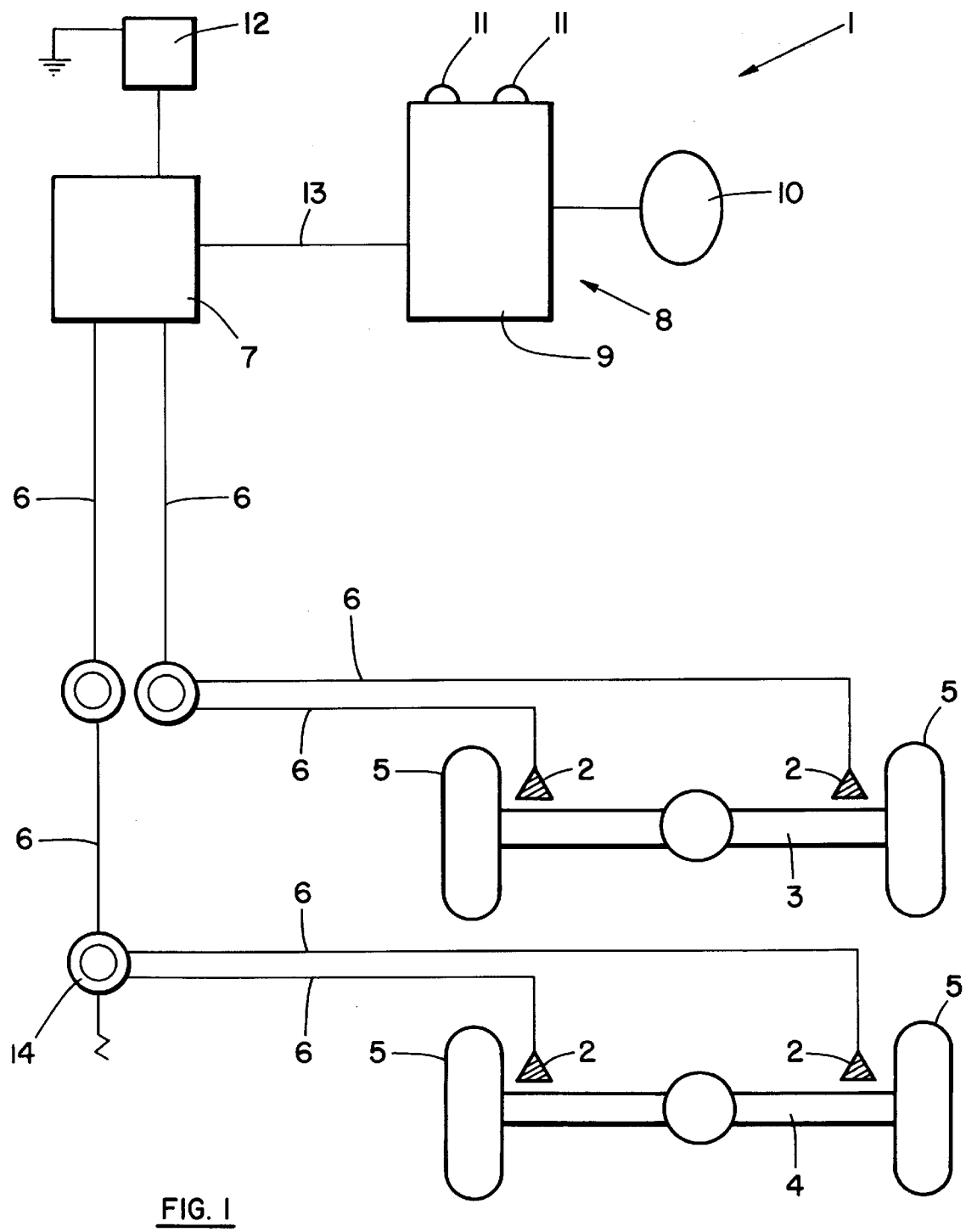
FIG. 1 is a schematic illustration of an early warning system according to the present invention.

One embodiment of the early warning system of the present invention for use on the axles of a vehicle, particularity heavy highway vehicles, is schematically illustrated in FIG. 1. The early warning system, generally indicated at 1, in its simplest form comprises one or more individual sensors 2 which are capable of monitoring heat, noise, vibration or knocking associated with potential problems which may result in tire rims and or complete wheel hub assemblies becoming detached from the vehicle. The sensors 2 are located on each individual axle 3 and 4. Wheels 5 are located at the end of each of the axles. The sensors' 2 location is typically determined by the sensitivity desired: the closer to the source of the heat, noise, vibration or knocking the greater the sensitivity. In the preferred embodiment the sensors are located on the axle within the wheel hub. The sensors 2 are connected by individual output lines 6 to a programmable micro processor 7. The micro processor 7 receives the information signal or data from the sensors 2. This information is in the form of voltage and resistance change. The micro processor 7 is programmable so that when a change in voltage and resistance reaches specified parameters the micro processor 7 determines an alarm condition is present and that data is sent to the alarm means 8. The micro processor 7 and/or alarm means 8 call either be separate pieces of equipment, may be combined in one device. Alternaively the alarm means 8 may be an already existing component on the vehicle that can be programmed to deal with the data from the sensors 2 and or the micro processor 7. This alarm means 8 preferably comprises an audio visual micro processing annunciator 9 which will alert the operator of the vehicle by alarm means 10 of the alarm condition: i.e. overheating, malfunctioning bearings, and or excessive knocks or vibration caused by broken studs, loose nuts, cracked rims and or improper bearing pre-load. The alarm 10 may be in the form of an LED display, lights, buzzer, or other visual or audio display device or combination of same.

A reset button 11 is preferably provided in association with the alarm means 8 that will enable the operator to confirm the alarm condition.

The system is powered as an auxiliary on the fuse box 12 and draws from the vehicle's electrical power supply system. A back up system can be provided such as a rechargeable battery etc.

By utilizing a digital programmable microprocessor 7 the system can be capable of storing in memory the data from the sensors 2 for inspection purposes to help determine the cause of detachment. Further a digital key pad can be provided to enable the operator to isolate specific sensors and/or perform other functions it required.

The sensors 2 are located on the individual axles 3, 4 as noted above. Each sensor 2 has its own output line(s) 6 which can be plugged in to the microprocessing unit 7.

These output lines 6 preferabbly use an eight wire harness. The sensors 2 convert the conditions being monitored, heat, noise, vibration and knocking, into resistance and voltage which is sent to the microprocessor 7. The microprocessor 7 is programmed so that a change in voltage and resistance meeting prescribed parameters over a defined period of time is deemed an alarm condition. This information is converted to data that is sent to the annunciator 9 which then alerts the operator by both visual and audio means 10 that a specific sensor(s) is detecting an alarm condition. The data is sent from micrprocessor 7 to the annunciator 9 by a four wire harness 13. The operator uses the reset button(s) 11 to confirm the sensor is detecting an alarm condition. The operator can then pull over and make appropriate repairs or request assistance to avoid the loss of a tire rim or wheel hub assembly 5. Where axle 3 reprsents the axles on the cab of a truck and axle 4 represents the axles on a trailer, provision can be made to connect the output lines from sensors on a pup trailer or piggy back through connection 14.

Figure 2:
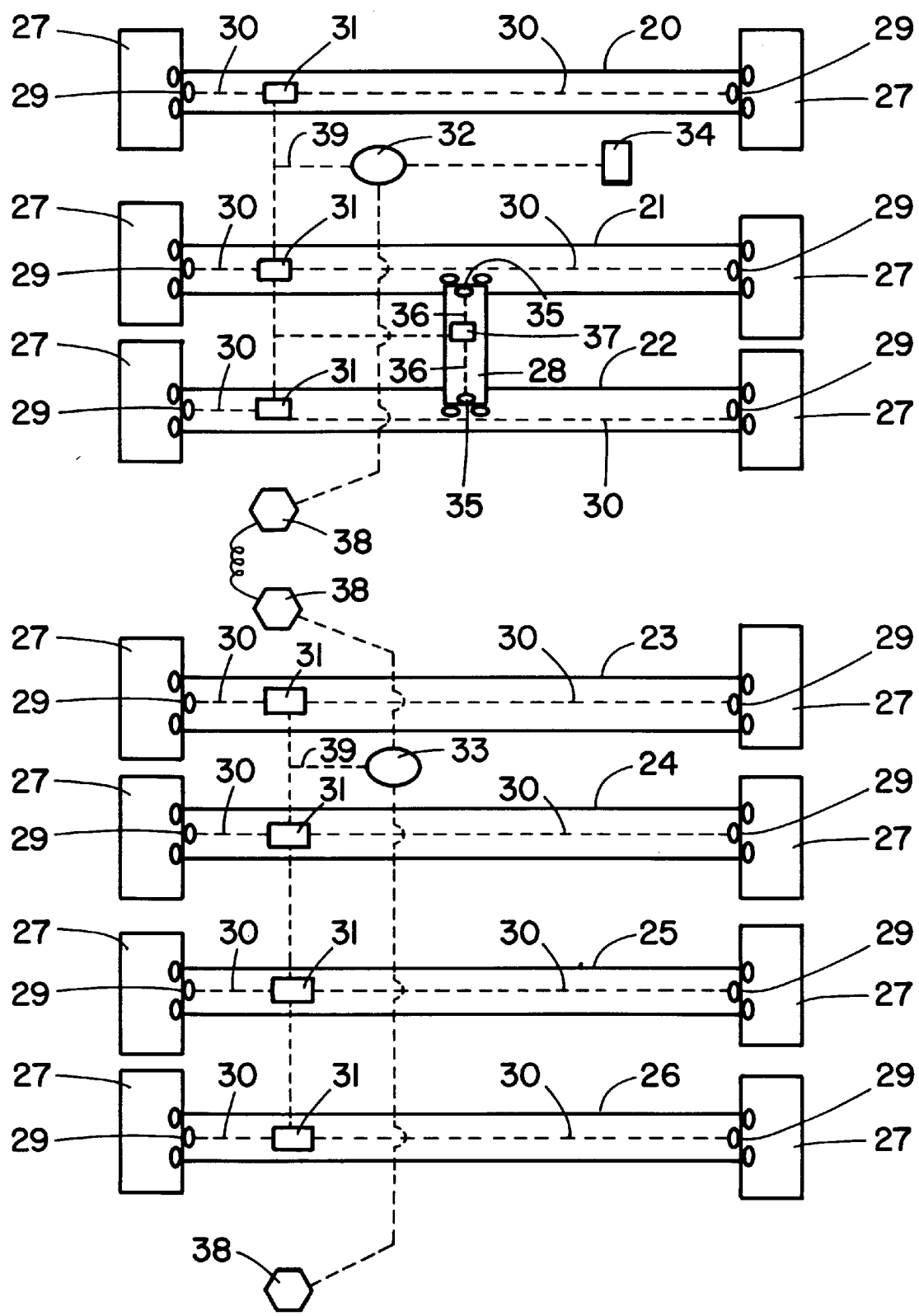
FIG. 2 is a schematic illustration of another embodiment of an early warning system according to the present invention.
Figure 3:
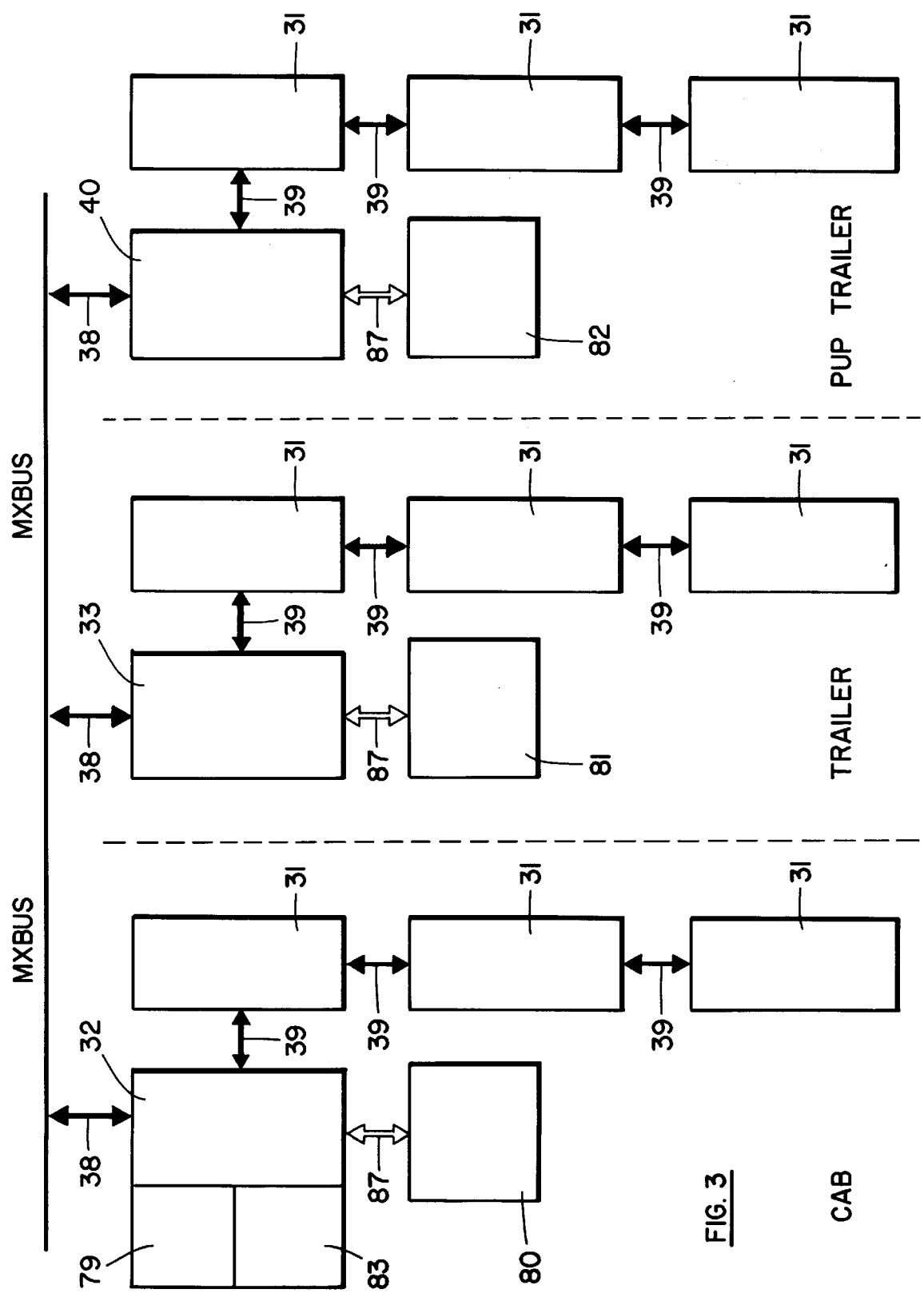
FIG. 3 is a block diagram of a preferred embodiment of the fault recording CPUs and sensor CPUs comprising a networked microprocessor system according to the present invention.

Another embodiment of the invention comprising a networked microcontroller based system that monitors and records all operating axle faults for a multi axle vehicle and in particular a cab and trailer hookup is schematically illustrated in FIGS. 2 and 3. FIG. 2 illustrates the front axle 20 and rear axles 21, 22 of a vehicle call and axles 23, 24, 25 and 26 of a trailer. Wheel assemblies 27 are located at the ends of each of the axles 20 to 26. The wheel assemblies 27 can be either single wheels as typically found on the front axle 20 or dual wheels as typically found on axles 21 to 26. Drive shaft 28 powers the rear axles 21, 22 of the cab. Sensors 29, capable of monitoring heat, noise, vibration, shocks and calibration or adjustment associated with the axles, brakes and wheels, are located adjacent each individual wheel assembly 27. The sensors 29 on each axle are connected by individual output lines 30 to a sensor module CPU (SMC) 31 located in proximity to each of the axles. The cab and trailer are each also equipped with a fault recording CPU (FRC), 32 and 33 respectively, that communicates with the sensor module CPU 31 for each axle of the cab or trailer respectivelly. The FRC 32 in the cab has an additional keypad and display used for system initialization and to provide a fault warning system 34 to alert the driver of any axle problems. Sensors 35 are also shown on drive shaft 28 to monitor heat, noise and vibration changes that could indicate drive shaft problems. These sensors 35 are connected by individual output lines 36 to a sensor module CPU 37 that communicates with the fault recording CPU 32.

In the preferred embodiment the FRC's, 32 and 33, communicate with each other on a multiplex bus (MXBUS) 38 that uses a wire connected to one of the pins on the standard seven pin connector between the cab and trailer for transmitting and receiving data. This is accomplished by pulsing a high frequency carrier on the selected wire. Dual frequencies are used, one for receive, one for transmit to allow for full duplex communication on the single wire. In the preferred embodiment a turn signal lamp wire is selected. The frequency carriers are low voltage, and are detectable even if the signal lamp is pulsing and will not interfere with the turn signals. The MXBUS is a three conductor bus, one for signal, one for signal corm, one for power. These conductors can be found on all truck harnesses that provide the center power pin for an auxilary circuit or power for the ABS brakes. For older equipment, the trailer will have to be equipped with a standard lead-acid battery to power the fault recording CPU. This battery could be charged by having the running lights activated for a period of time.

As best illustrated in FIG. 3, all FRC's. 32 and 33, communicate with their own local SMC's 31 via a sensor module bus (SMBUS) 39. The SMBUS is preferably a four conductor bus utilizing the RS-485 interface standard. This interface standard implements a balanced multi-point transmit/receive communication line used in a party line configuration. This allows the cab FRC 32 to connect to the SMC on axle 20, the SMC on axle 20 to the SMC on axle 21 and the SMC on axle 21 to the SMC on axle 22. The trailer FRC 33 connects to the SMC on axle 23, the SMC on axle 23 to the SMC on axle 24, the SMC on axle 24 to the SMC on axle 25 and so on to the last trailer axle. This feature reduces the amount of wiring harness along the bottom of the cab or trailer.

If a pup trailer is hooked up to trailer a similar arrangement is utilized. The sensors on each axle are connected by individual output lines to a sensor module CPU (SMC) 31 located in proximity to each of the axles on the pup trailer. The pup trailer is also equipped with a fault recording CPU (FRC) 40 that communicates with the sensor module CPU for each axle of the pup trailer. The pup trailer FRC 40 communicates with FRC's in the cab 32 and on the trailer 33. As noted in the preferred embodiment all the FRC's communicate with each other on a multiplex bus (MXBUS) 38 that uses a free turn signal lamp wire for transmitting and receiving data.

Figure 4:
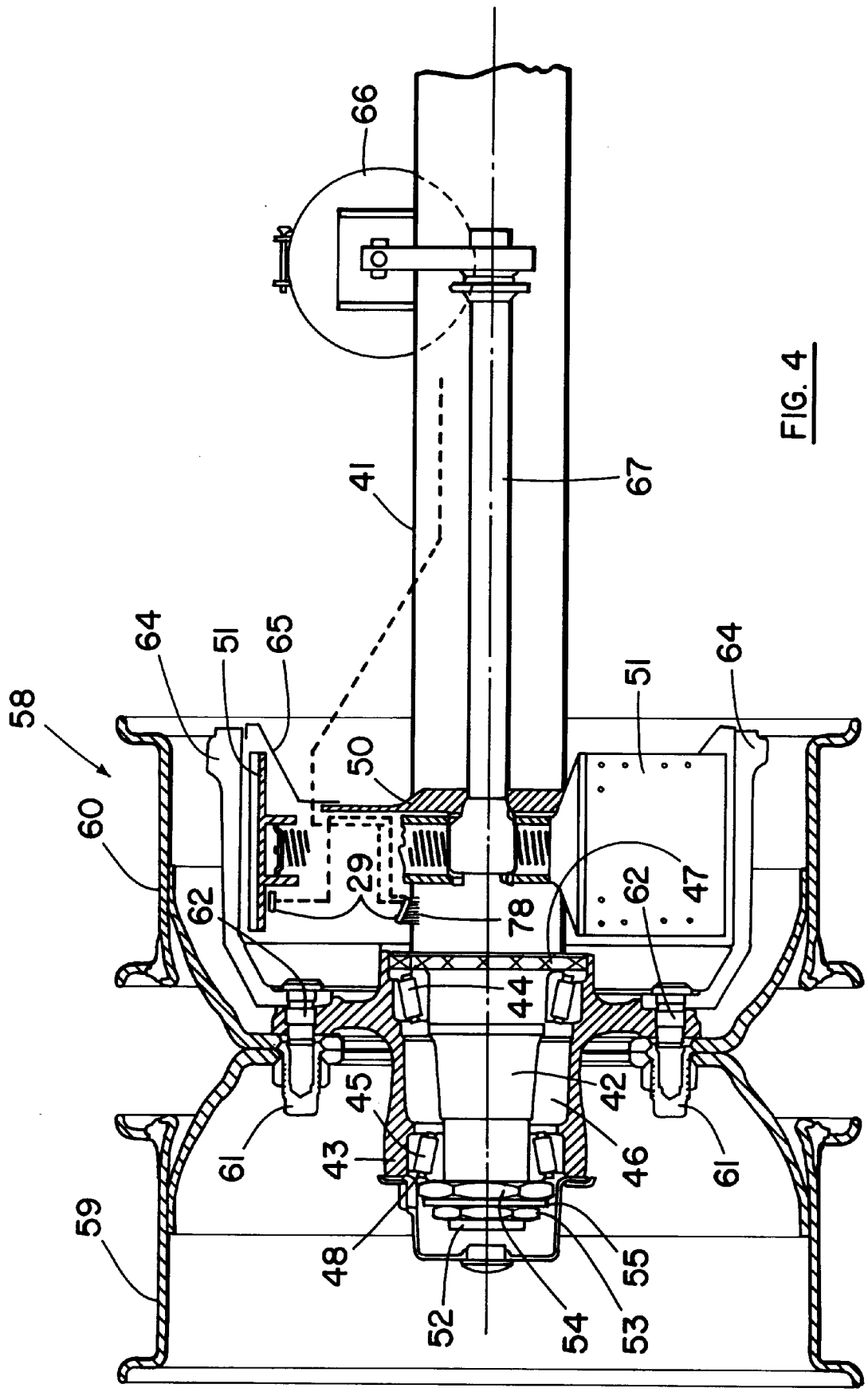
FIG. 4 is a lateral plan view in partial cross section of a typical axle for a dual wheel assembly having a sensor mounted thereon in accordance with the present invention.

A typical axle having a sensor mounted thereon in accordance with the present invention is illustrated in FIG. 4. One end of an axle 41 is illustrated partly in cross section. The other end of the axle would typically be the mirror image of the end illustrated. A spindle 42 projects beyond the end of the axle 41. A hub 43 encases the spindle 42 and inner bearings 44 and outer bearings 45. The cavity 46 between the hub 43 and spindle 42 is half filled with oil and sealed by inner seals 47 and an outer seal 48. A grit cover 49 is located on the axle behind the inner seal 47. A brake support spider 50 is welded to the axle 41 and supports brake shoes 51. The end 52 of the spindle 42 is threaded to permit attachment of the tire assembly by means of hub lock nuts 53, 54 and lock washer 55. A typical dual tire assembly, generally indicated at 58, consists of a pair of tires (not shown) mounted on rims either in the form of bud rims 59, 60 (as shown) or on a spoke hub assembly not shown. The bud rims 59, 60 are attached by wheel nuts 61 and studs 62 to hub 43. Hub cap 63 encloses the end of the spindle 42. A brake drum 64 is also connected to hub 43 by studs 62 and the brake drum 64 encases the brake shoes 51. A dust shield 65 is connected to the brake support spider 50. A brake mini 66 is connected to the brake cam shaft 67.

As noted above the main reason for the detachment of rims 59,60 or hubs 43 is due to the overheating of wheel bearings 45 and 44 due to a lack of lubricant and/or improper bearing load. Accordingly the present invention utilizes sensors 29 that are capable of monitoring the temperature of the wheel assembly on the end of any axle and comparing it to the temperature of the other wheels on the same axle and other axles as well as a pre-selected maximum permitted temperature. The sensors 29 are also capable of monitoring noise, vibration and knocking associated with the each axle and wheel hub assembly caused by improper bearing preload, a cracked bearing case, loose wheel nuts, broken studs and cracked rims which are also indications of possible imminent detachment.

Figure 5A:
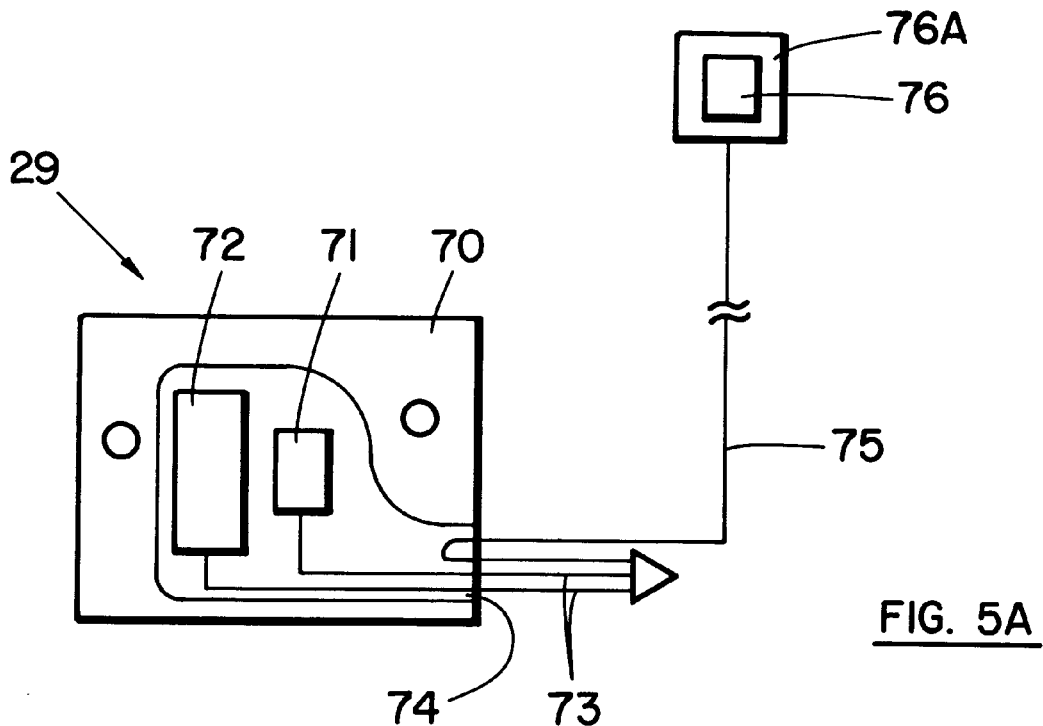
FIG. 5A is schematic view of a sensor in accordance with the present invention.
Figure 5B:
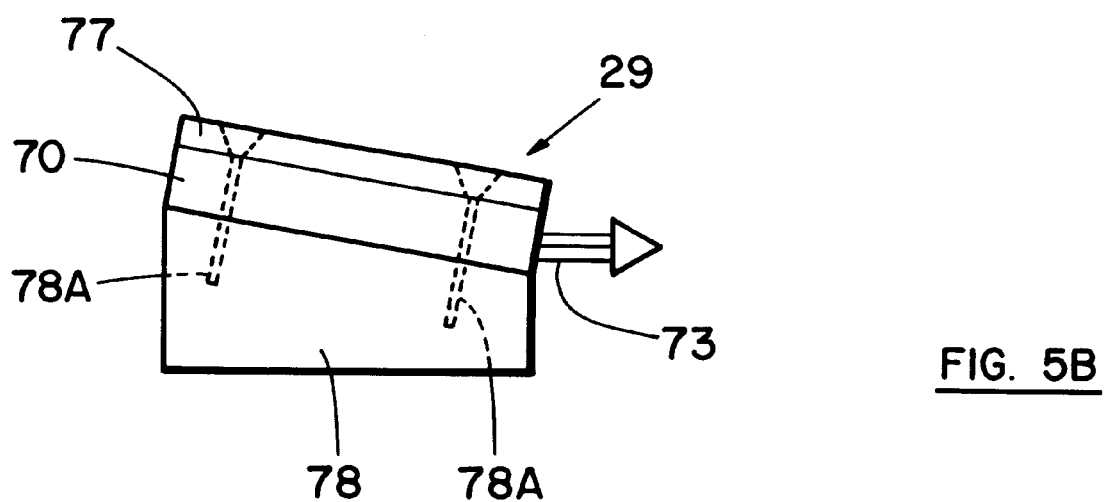
FIG. 5B is a side plan view of a sensor in accordance with the present invention attached to a block which is to welded to an axle.

In FIGS. 5A and 5B the preferred configuration of sensors 29 is illustrated. Each sensor 29 consists of a thermally conductive housing 70 into which is mounted a temperature transducer 71 to monitor the temperature of the wheel bearings 44, 45 and a vibration transducer 72 for monitoring noise, vibration and knocking. In the preferred embodiment, output lines 73 from each of the temperature transducer 71 and vibration transducer 72 exit the housing through outlet 74. An additional wire 75 is looped within the outlet 74 to permit connection to a second remote temperature transducer 76. This second temperature transducer 76 can be encased within a thermally conductive housing 76A, sealed with epoxy to prevent moisture and/or ambient air from interfering with the operation of the sensor and mounted adjacent the brake shoes (as shown in FIG. 4) to monitor any changes in the temperature of the brakes which may be indicative of a problem. The housing 70 is enclosed by panel 77 and sealed with epoxy to prevent moisture and/or ambient air from interfering with the operation of the sensor The housing 70 and panel 77 are constructed of thermally conductive materials so that any temperature changes caused by overheating of the wheel bearings can be detected by temperature transducer 71. The sensor 29 is secured by screws 78A to a block 78 which is adapted to be welded to the axle 41 adjacent the wheel assembly. The temperature of the bearings is transmitted through the axle and accordingly the proximity of the sensor 29 and block 78 to the wheel bearings 44, 45 the more reliable the readings. The housing 70 and panel 77 are preferably fabricated from stainless steel (303 SS) to resist corrosion. The block 78 is preferably welded to the axle 41 between the hub 43 and the brake support spider 50 as shown on FIG. 4

The sensors 29 are connected by individual output lines 73, 75 to a sensor module CPU 31 located in proximity to each of the axles. The sensor module CPUs are preferably attached to the frame of the cab and trailer(s). As shown in FIG. 3 the cab, trailer and pup trailer if any are each also equipped with its own fault recording CPU (FRC)32, 33 and 40 respectively, that communicates with the sensor module CPU for each axle of the cab or trailer or pup trailer. The FRC 32 in the cab has an additional keypad and display 79 used for system initialization and to provide a fault warning system to alert the driver of any axle problems. Each FRC 32, 33 and 40 is also equipped with an interrogation interface 80, 81 and 82 respectively for connection to a hand held terminal or lab top computer. This feature allows interrogation of isolated trailers as well as cab/trailer hookups.

The FRC 32 in the cab has a real-time clock 83 for logging date and time of occurring faults. During initialization of a cab/trailer hookup, the cab FRC 32 will transfer the current date and time to the FRC 33 for the trailer and the FRC 40 for the pup trailer if any. When the cab FRC 32 receives faults from the trailer FRCs 33, 40, it will respond by sending back the date and time for storage in the trailer FRC EEProm 84. This eliminates the need for a battery backed-up read time clock on trailer FRC's 33,40. The cab FRC 32, maintains battery power to the real time clock from the cab battery to maintain the time. The time and date can be reset and verified by the driver prior to initializing all trailers in the system should the cab battery be disconnected or fail in service.

Each Sensor Module CPU (SMC) 31 will monitor two temperature sensors 71, 76 (bearing, brake) and one vibration sensor 72 for each wheel on the axle. If any wheel generates a suspected fault, the fault code is transmitted by the SMC 31 to the FRC 32, 33 or 40 for further processing. The FRC is then responsible for verifying the fault is true by comparing to all other axles on the trailer/cab. If the fault is valid it is then hard recorded in the EEProm 84 and passed on to the cab FRC 32 through a multiplexed connection (MXBUS) 38 for driver warning.

The FRC's 32, 33 and 40 can communicate with each other by a variety of known means. The FRC's could be connected by wire or co-axial cable however authorities are discouraging additional wire connections between the cab and trailer and restricting wire or cable to the current seven prong connection. Radio receivers and transmitters or cellular connections could be utilized however a reliable, secure interface without the possibility of outside interference or disruption is required.

Figure 7:
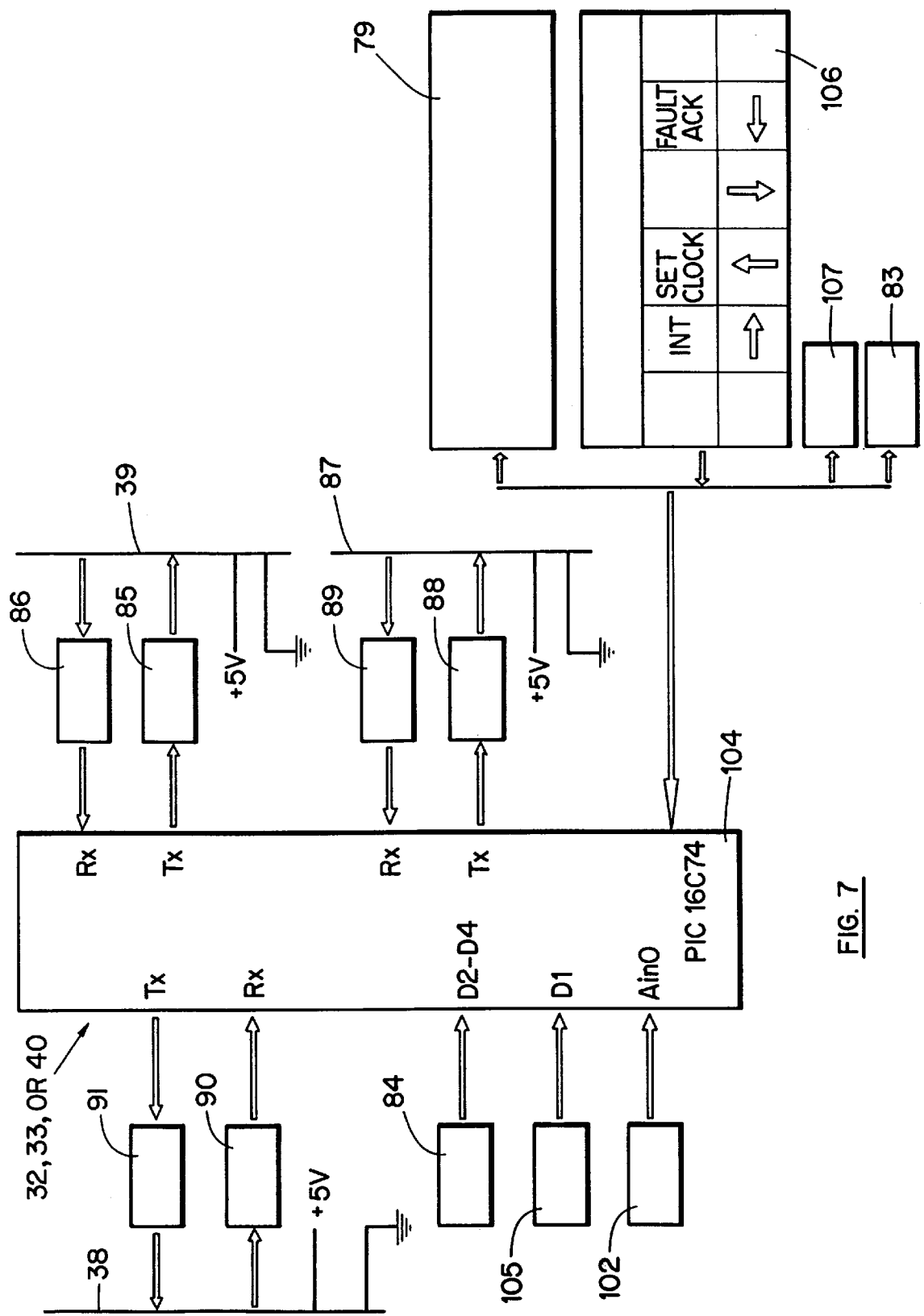
FIG. 7 is a block diagram for a fault recording CPU illustrated in FIG. 3.

As shown in FIGS. 3 and 7, in the preferred embodiment the FRC's, 32, 33 and 40, communicate with each other on a multiplexed connection (MXBUS) 38 (see FIGS. 3 and 7) that uses a circuit in the standard seven pin (J560 pin). As noted above in the preferred embodiment a free turn signal lamp wire is utilized for transmitting and receiving data. This is accomplished by pulsing a high frequency carrier on the turn signal wire. Dual frequencies are used, one for receive through receiver 90, and one for transmit by transmitter 91 to allow for full duplex communication on the single wire. These frequency carriers are low voltage, and are detectable even if the signal lamp is pulsing and will not interfere with the turn signals. The MXBUS is a three conductor bus, one for signal, one for signal corn, one for power. These conductors can be found on all truck harnesses that provide the center pin for power to the ABS brakes. For older equipment, the trailer will have to be equipped with a standard lead-acid battery to power the fault recording CPU, this battery could be charged by having the running lights activated for a period of time.

By utilizing a multiplexing connection between the cab and trailer, it is possible to incorporate a number of programmable auxiliary features into the system. In accordance with U.S. regulations after Mar. 1, 2001 all tractors must have in-cab warning lights and trailers must be capable of sending a signal to the tractor if there is an antilocking brake system (ABS) malfunction on the trailer. Currently the warning light is located on the trailer. The present invention provides a very effective solution to this requirement. In addition the system can be programmed so that the operator can control from the cab: lift axle operation, operate rear door locks, operate emergency stop warning lights on the trailer, operate tail gates, hoppers, valves and chutes, operate back up lights and horn on the trailer. The operator can also from the cab monitor: drive shaft overheating, brake adjustment on the trailer, brake pad wear, trailer refridgeration units, load shift or weight of the trailer and the like.

All FRC's communicate with their own local SMC's via a sensor module bus (SMBUS) 39. The SMBUS 39 is preferably a four conductor bus utilizing the RS-485 interface standard. The SMBUS includes transmitter 85 and receiver 86 at the FRC and corresponding transmitter 92 and receiver 93 at the SMC. This interface standard implements a balanced multi-point transmit/receive communication line used in a party line configuration. This allows the FRC 32 to connect to SMC 31 on axle 20, SMC 31 on axle 20 to SMC 31 on axle 21 and so on to the last axle. This feature reduces the amount of wiring harness along the bottom of the cab or trailer.

As shown in FIGS. 3 and 7, all the FRC's 32, 33 and 40 communicate with their corresponding Interrogate Terminal 80, 81 and 82 via an interrogate bus (ITGBUS) 87. This bus preferably uses a standard three conductor RS232 communication protocol, which is available on all standard computer equipment. Again the ITGBUS includes a transmitter 88 and receiver 89. An extra power plug will be provided by the Interrogate Terminal for connection to a trailer FRC which may be isolated with no existing power.

Figure 6:
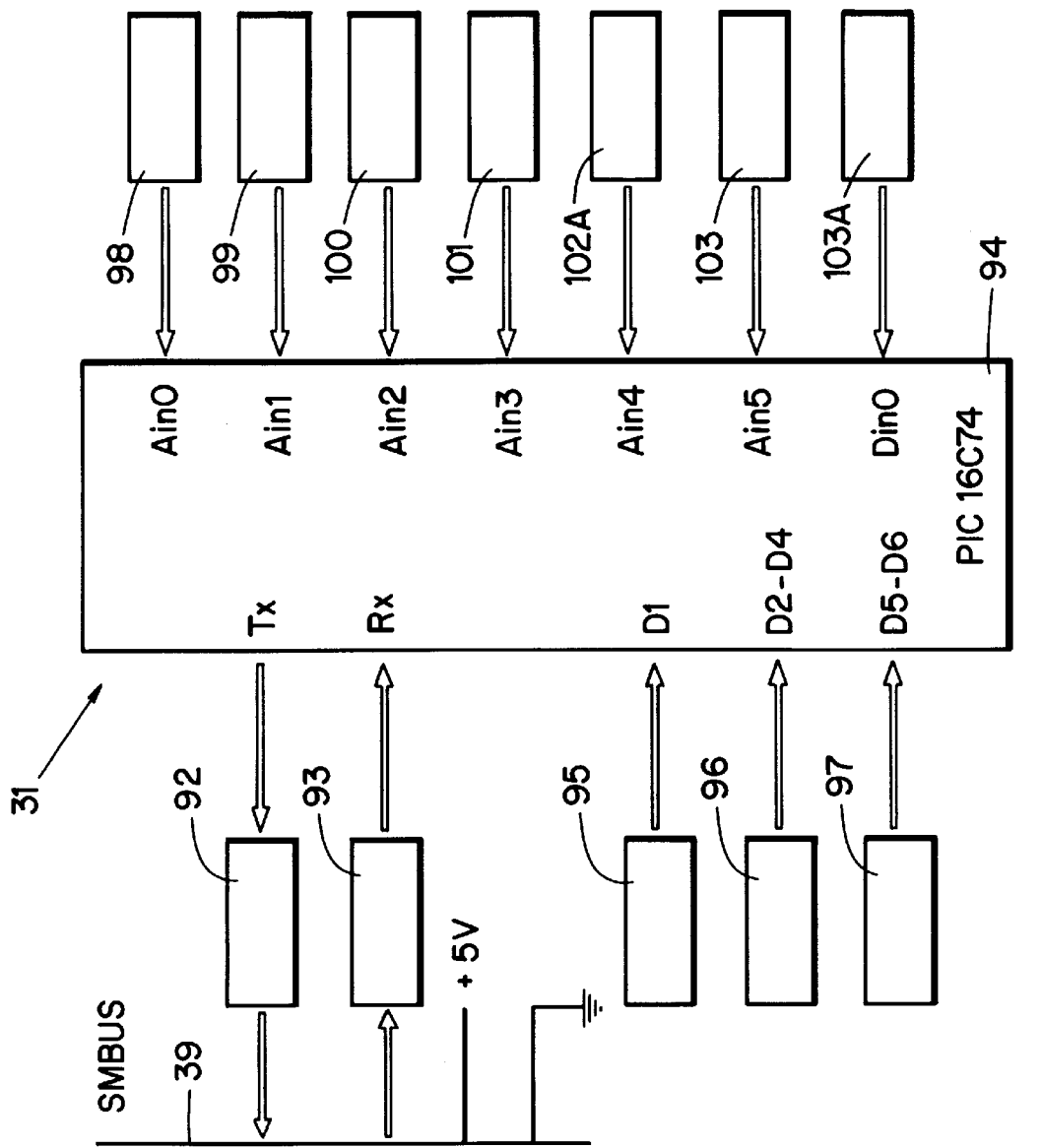
FIG. 6 is a block diagram for a sensor module CPU illustrated in FIG. 3.

As shown in FIG. 6, each sensor module CPU 31 has a microcontroller 94 to measure all sensors 29 on its axle and to communicate with the corresponding FRC 32, 33 or 40. A PIC16C74 microcontroller has been used in the preferred embodiment. Each SMC 31 is equipped with a silicon hardware ID code 95 for module identification. This identification number can be transferred to and logged in the FRC EEProm 84 during every initialization.

Each SMC 31 preferably has a hardware jumper 96 to identify its axle number to the FRC. This jumper is preferably set prior to shipping, and SMC's can be identified by a label (ie Axle 1) for installation. An optional EEProm 97 can be connected to the SMC 31 for programmable identification and calibration parameters.

The SMC 31 program design (FIGS. 22 to 28) is broken into two basic areas: Sensor Hardware/Fault Algorithm Design and Software Communication Protocol Design. The Sensor Hardware/Fault Algorithm Design is programmed as follows:

Temperature of the bearings and brakes is measured by sensors 29 preferably using a semi conductor sensor for the bearings and a platinum resistance probe (RTD) for the brakes. The RTD probe has an operating range of −200° C. to 800° C. with an excellent temperature stability of less than 1% over the range −50° C. to 800° C. The platinum RTD probe has a large resistance change output for its operating range, 80 ohms at −50° C. to 375 ohms at 800° C. with good linearity over that range. By applying a 1 ma reference current to the probe, a voltage output of 60 mv to 375 mv over the −50° C. to 800° C. range can be achieved. This signal can then be amplified and sampled by the corresponding SMC 31 analog/digital (A/D) input: 98 for left bearing temperature, 99 for right bearing temperature, 100 for left brake temperature and 101 for right brake temperature. Gain is used to adjust the span of temperature measurement for the bearing or brakes. This will also determine the temperature resolution of the A/D converter within microcontroller 94. The A/D converter in the preferred microcontroller has 256 steps, providing the following resolutions:

Bearing Temperature: 0 to 250 Deg C approx: 1 deg/step

Brake Temperature: 0 to 800 Deg C approx: 3 deg/step

Ambient temperature (TAmbient) is monitored by the FRC 32, 33 and 40 by temperature transducer 102 and then transferred to all sensor module CPU's. A temperature fault will exist under the following conditions, where TBearing is the temperature of the bearing as measured by temperature transducer 71 (FIG. 5), TAmbient is the ambient air temperature measured by the temperature transducer 102 at the FRC, TBearing Maximum is a pre-selected temperature difference indicative of overheating, TBrakeLeft is the temperature of the left brake on an axle measured by the second temperature transducer 76 (FIG. 6), TBrakeRight is the temperature of the right brake on the same axle measured by temperature transducer 76 and TBrake Maximum is a preselected temperature difference indicative of overheating:

1. TBearing−TAmbient>TBearing Maximum=fault
2. TBrakeLeft−TBrakeRight>TBrake Maximum=fault In the preferred embodiment a TBearing Maximum of 190° F. has been selected to indicate an alarm condition. With respect to the brake temperature, a 30% differential between the left and right brake on an axle is preferably used to indicate an alarm condition.

Vibration Knocking vibration on the wheel/axle joint can be measured by sensor 29 using a vibration transducer 72, preferably a crystal transducer, as schematically illustrated in FIG. 5. The transducer 72 produces a voltage proportional to the amplitude and frequency of the vibration being generated by the wheel/axle joint. The Xtal signal (amplitude and time as plotted on the X-Y axis) can be amplified, rectified and filtered to leave the low frequency enveloped. The microcontroller is programmed to determine a Vibration Fault Condition under the following conditions:

Knock: The Sensor Module CPU 31 can monitor the rectified/filtered signal on its A/D input, 102A for left wheel vibration transducer and and 103 for the right wheel vibration transducer, for a fixed amount of time (ie 10 wheel revolutions) and determine if there is a cyclic pattern to the knock by measuring the time duration between pulses. The wheel lock signal will help to determine if there is a phase relationship of knock to wheel position regardless of wheel speed. If a phase-locked pattern is detected a fault code is sent to the FRC. The FRC would then check other wheels to see if the same fault is occurring on other axles (which would be indicative of road noise). The FRC would monitor the condition for a fixed time interval and if the fault is still valid it is then passed on to the cab FRC to alert driver of possible trouble.

Grind: A continuous high amplitude signal, regardless of wheel position may indicate a bearing grind, and would be used to generate a fault if it is produced for an extended period of time. This would probably be accompanied with increased bearing temperature.

Each SMC communicates on the SMBUS with the FRC as follows.

1. The FRC sends out a 4 byte command structure to the SMC ie. 1. [Axle ID]—axle id number to select the specified SMC.

2. [Command]—requested action of SMC—see table below.

3. [Parameter]—additional command parameter

4. [:]—the end of command character

Figure 8:
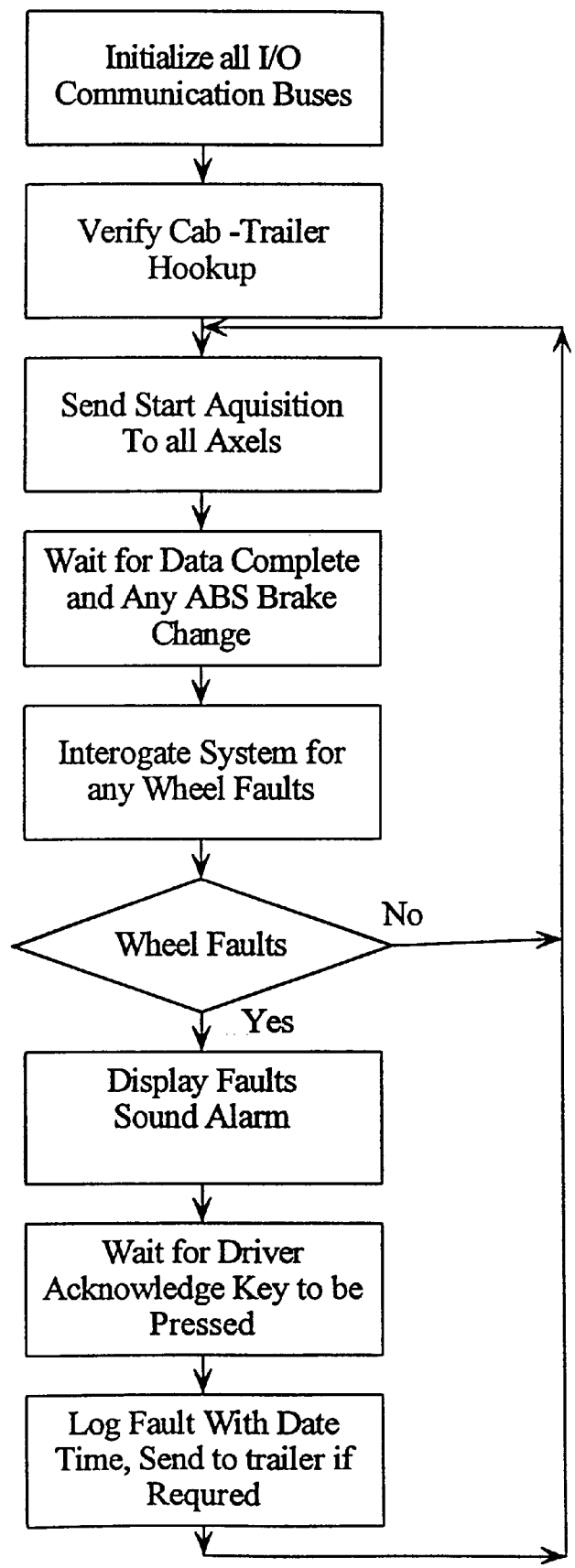
FIG. 8 is a flow chart of the general system control from cab during data sampling.
Figure 9A:
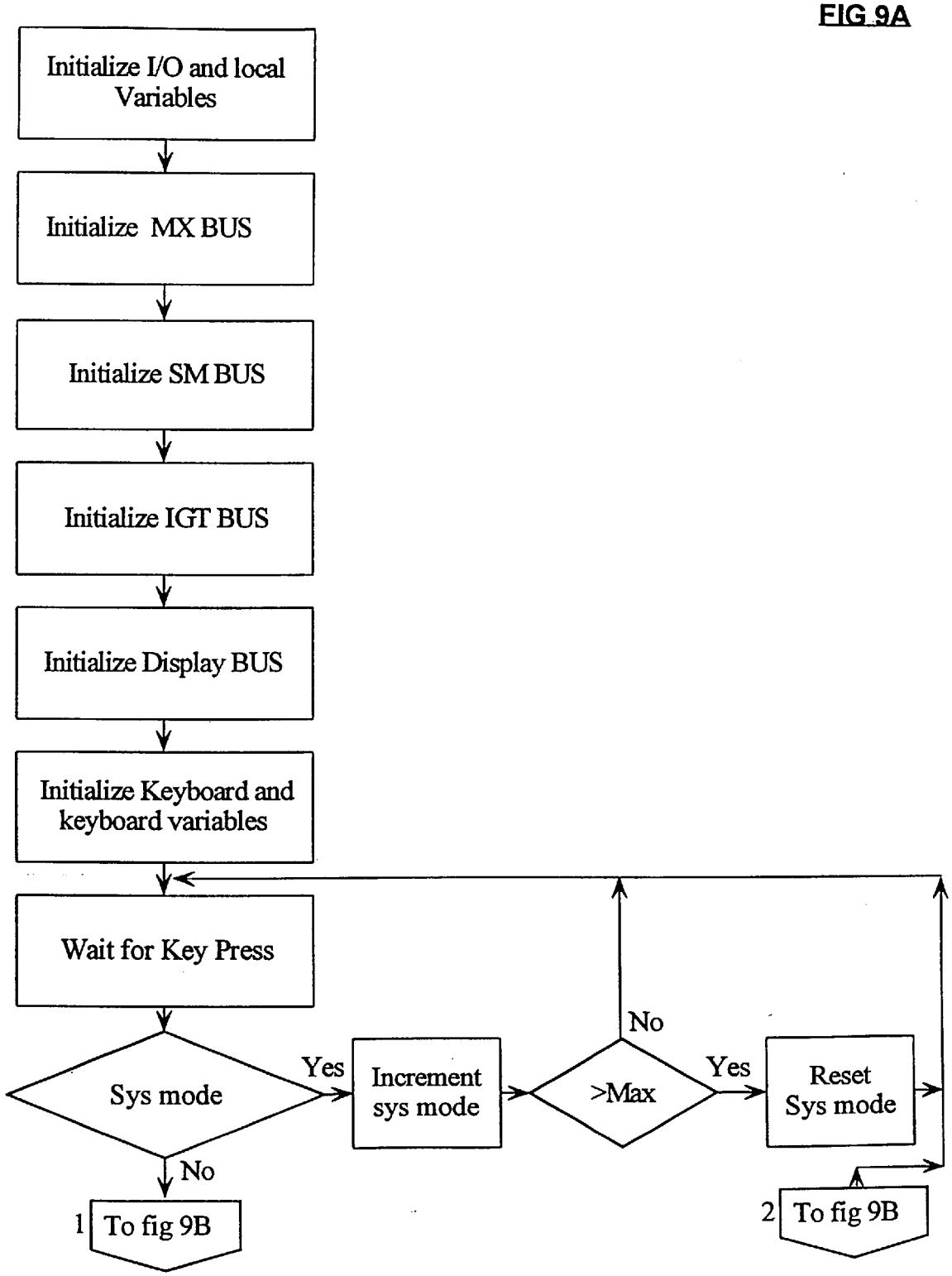
FIG. 9 is a flow chart of the cab fault recording CPU.
Figure 9B:
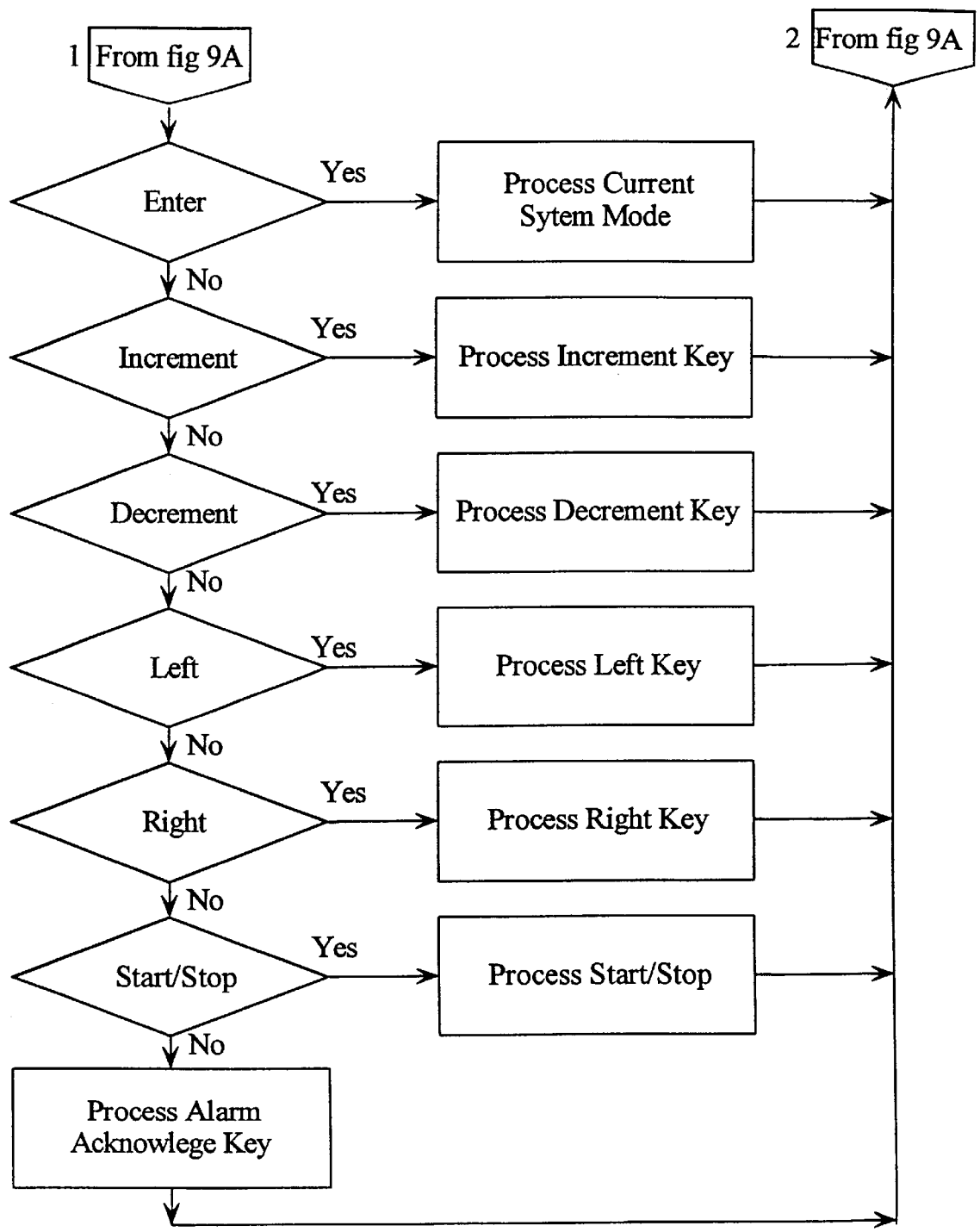
Figure 10:
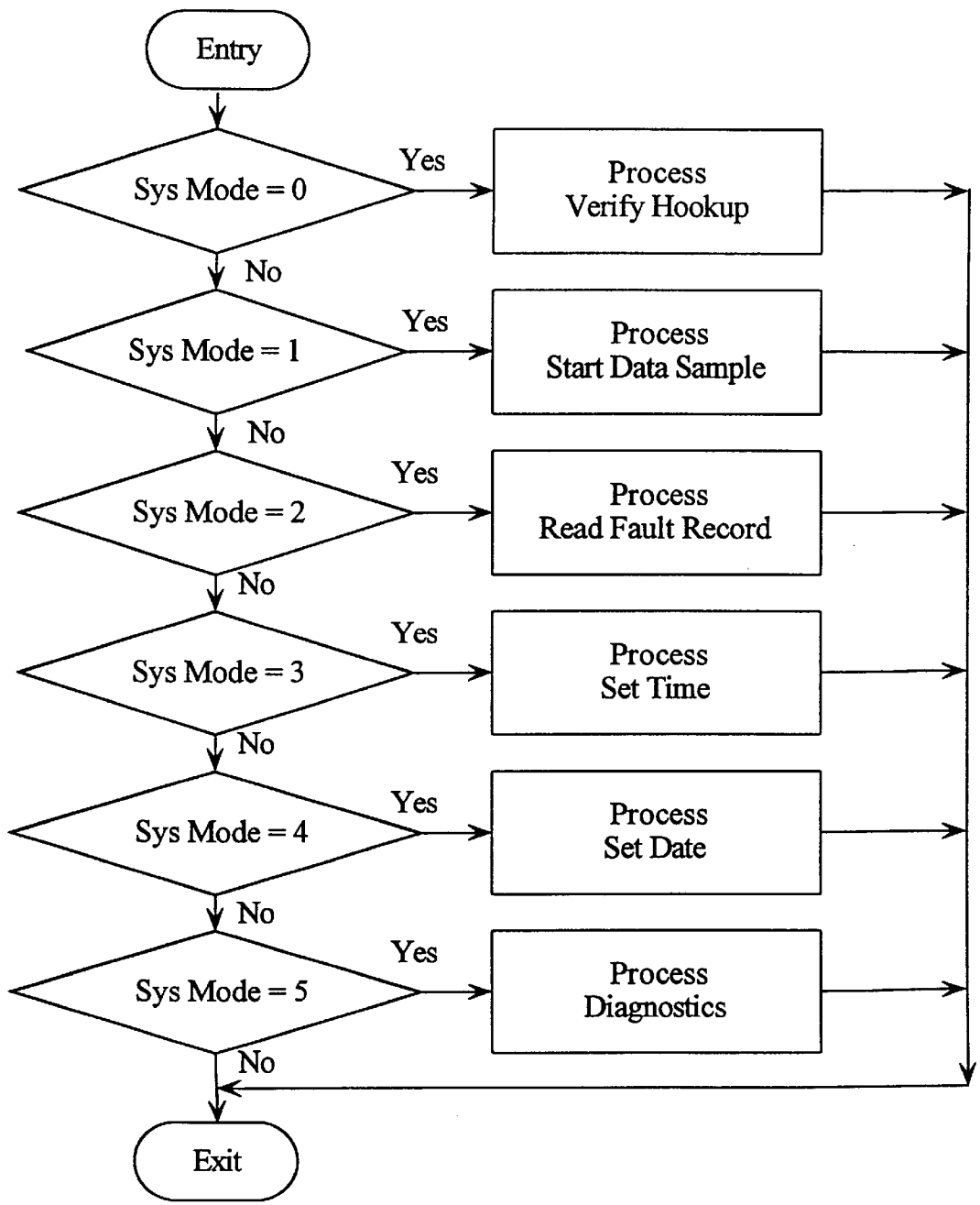
FIG. 10 is a flow chart of the process current system mode module of FIG. 9.
Figure 11:
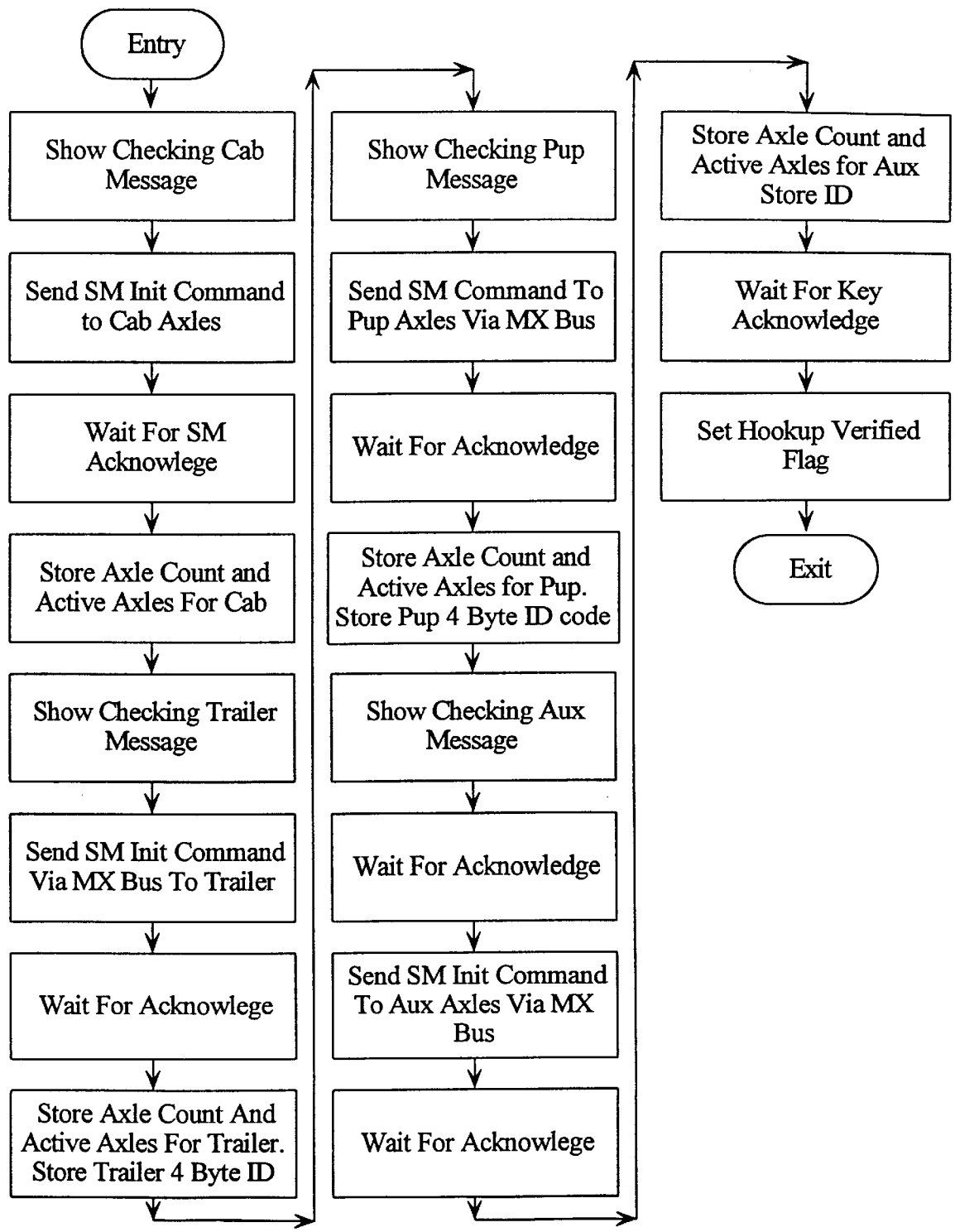
FIG. 11 is a flow chart for the process verify hookup module of FIG. 9.
Figure 12:
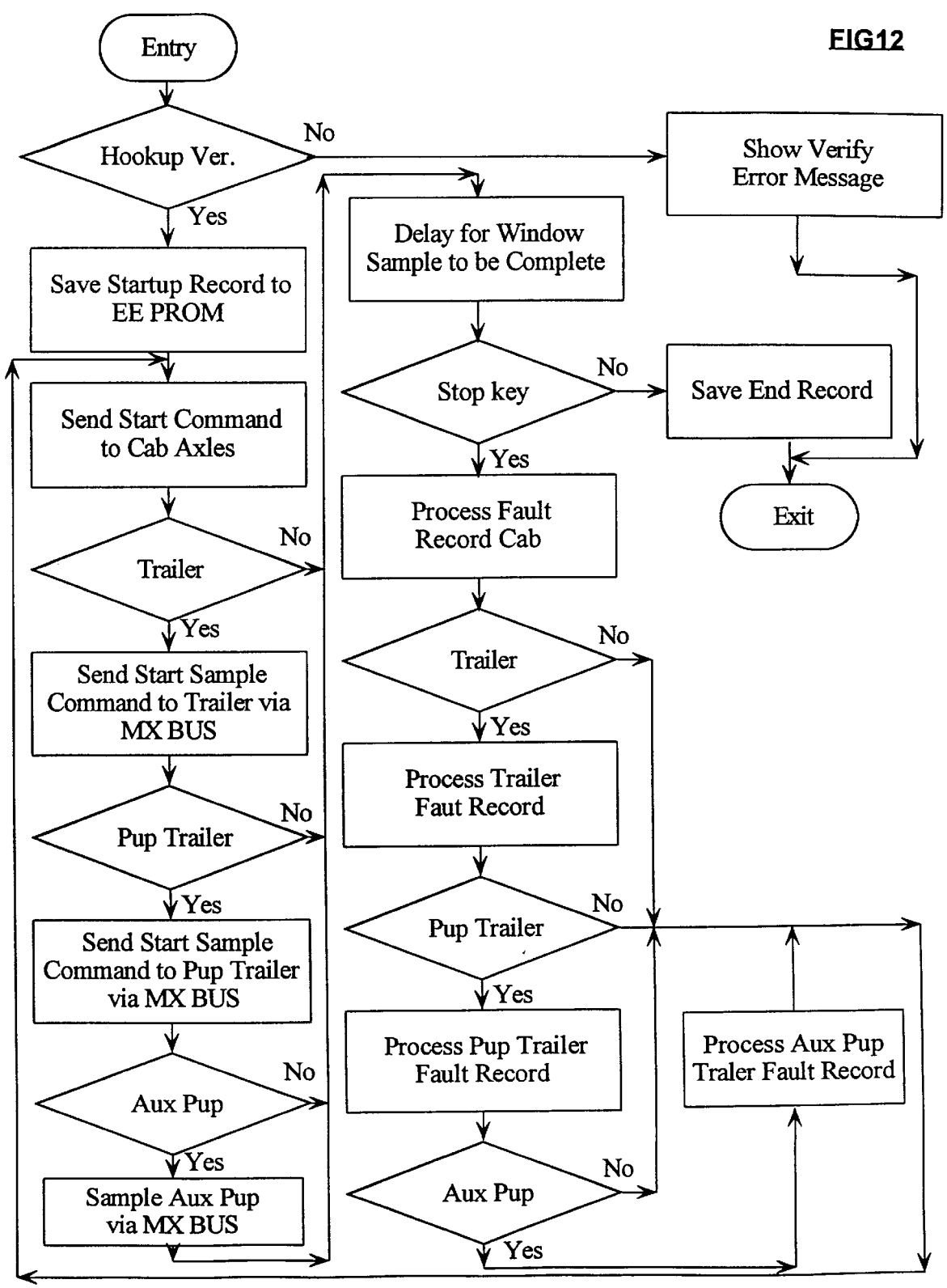
FIG. 12 is a flow chart of the CAB FRC start data module of FIG. 9.
Figure 13:
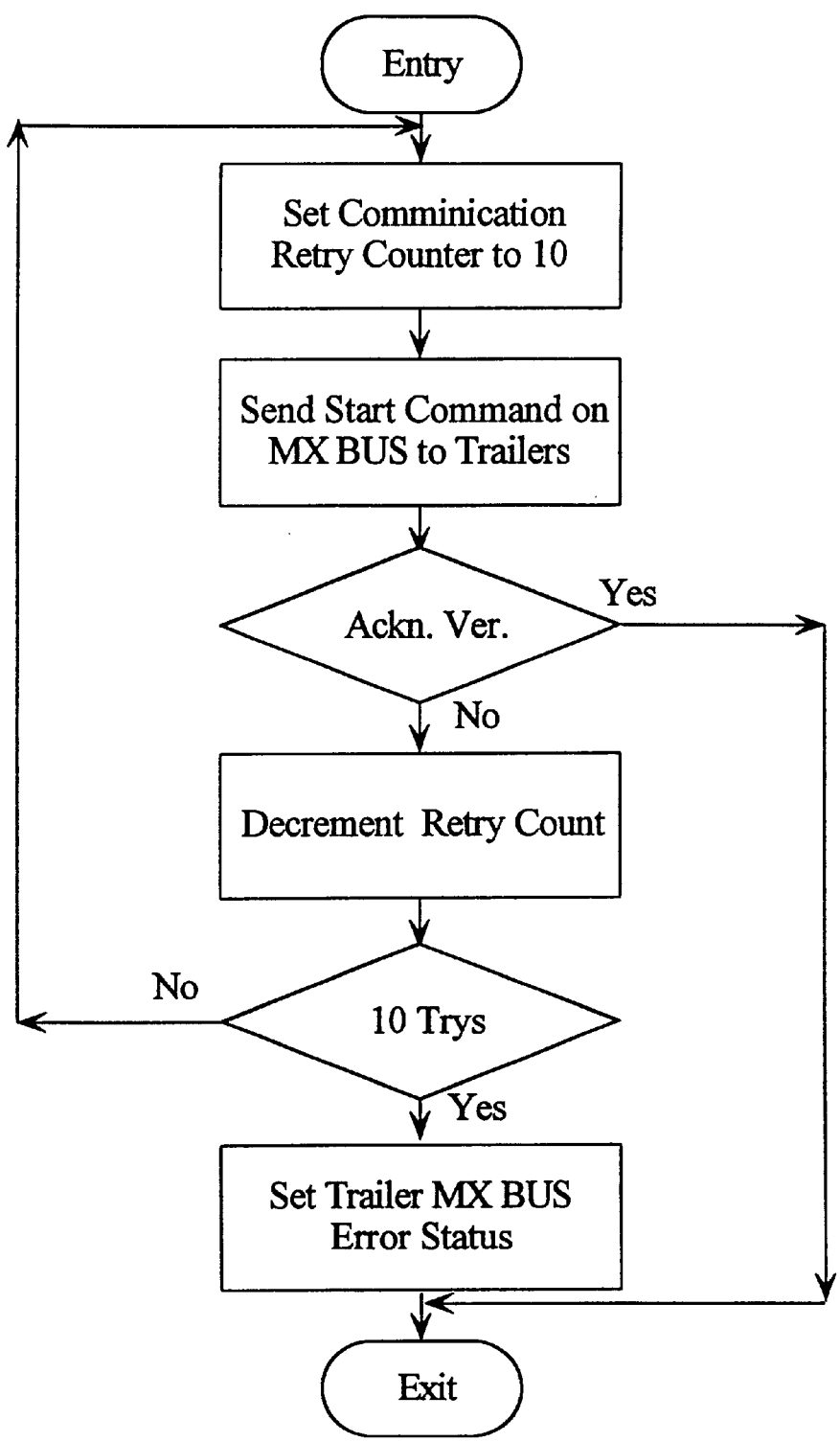
FIG. 13 is a flow chart of the send start command module of FIG. 9.
Figure 14:
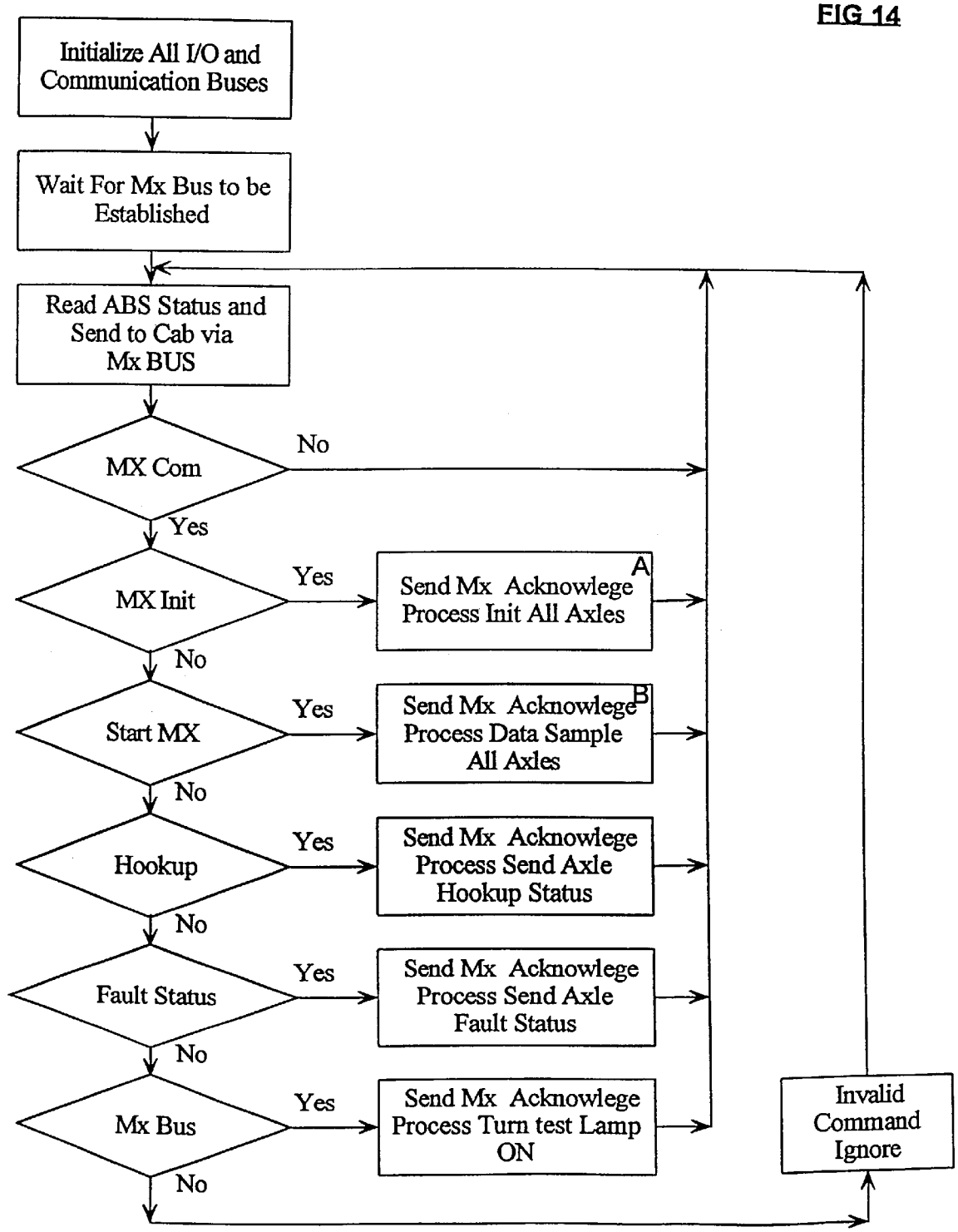
FIG. 14 is a main flowchart for FRCs.
Figure 15:
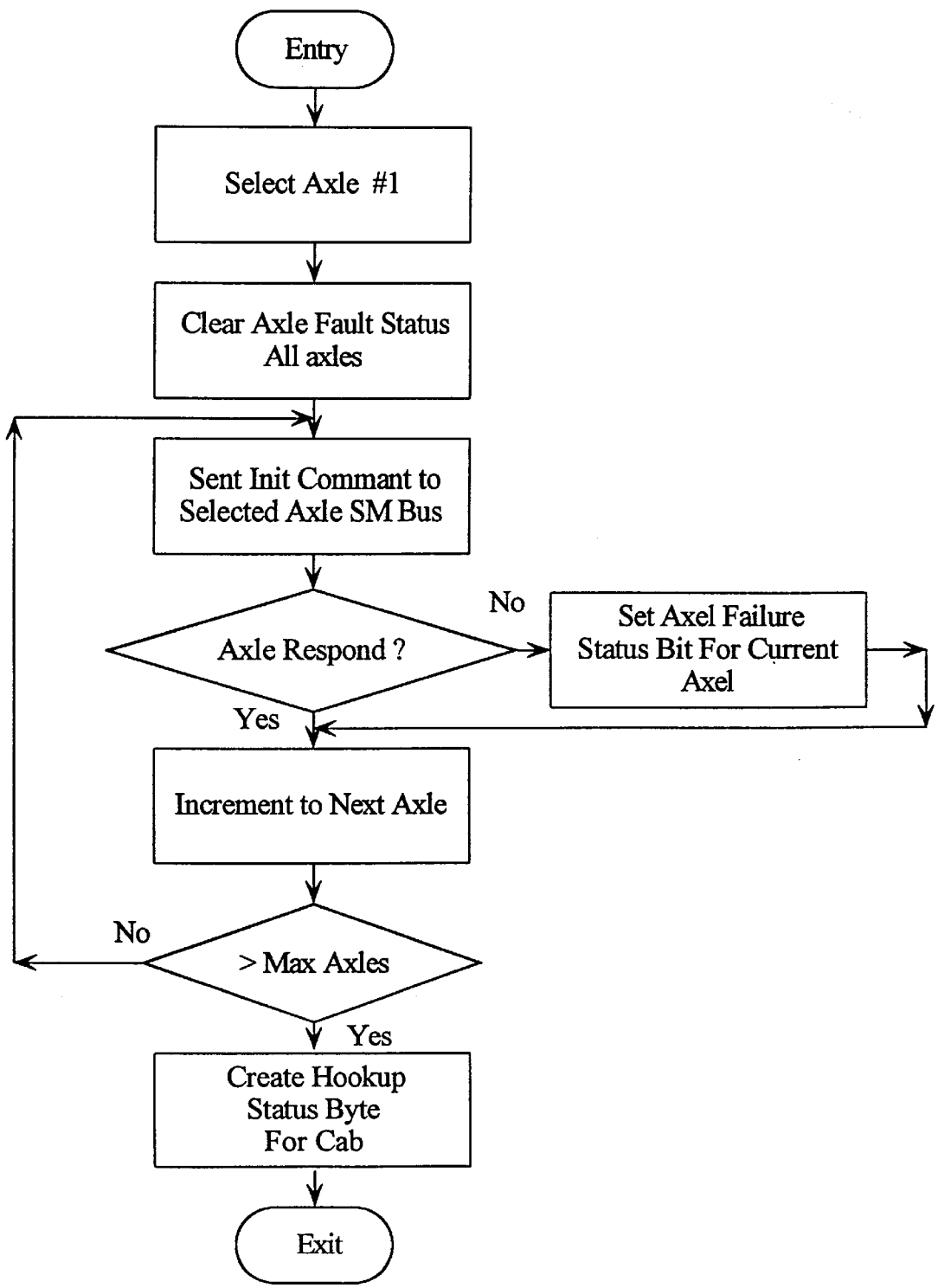
FIG. 15 is a flow chart of the process for Initialization of all axles module of FIG. 14.
Figure 16:
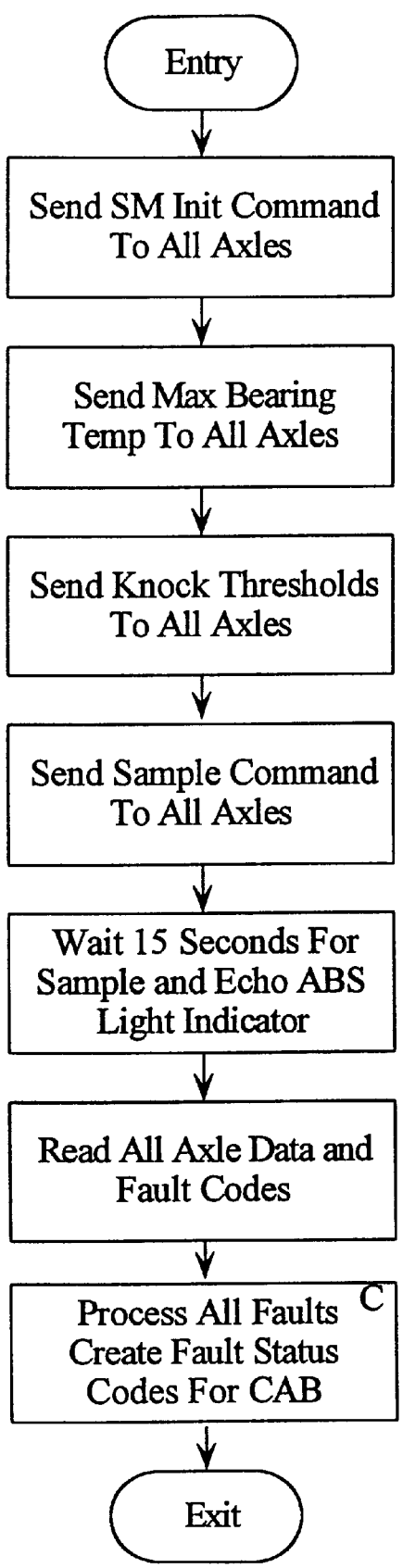
FIG. 16 is a flow chart of the process data sample of all axles module of FIG. 14.
Figure 17:
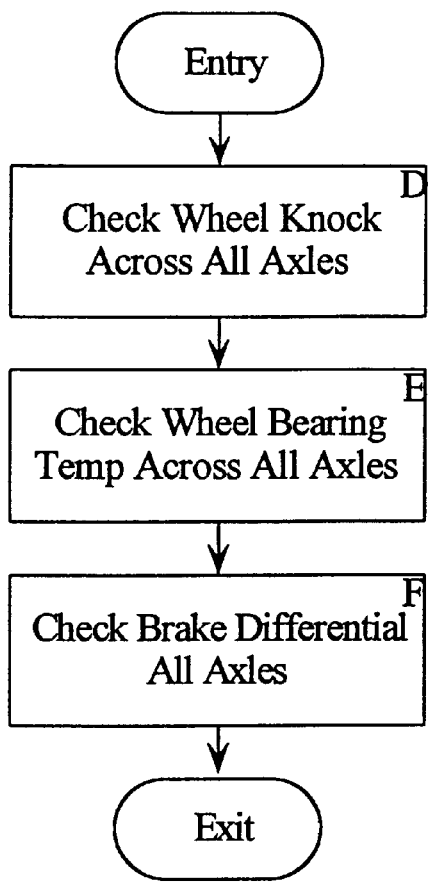
FIG. 17 is a flow chart of the process all axle faults module of FIG. 14.
Figure 18A:
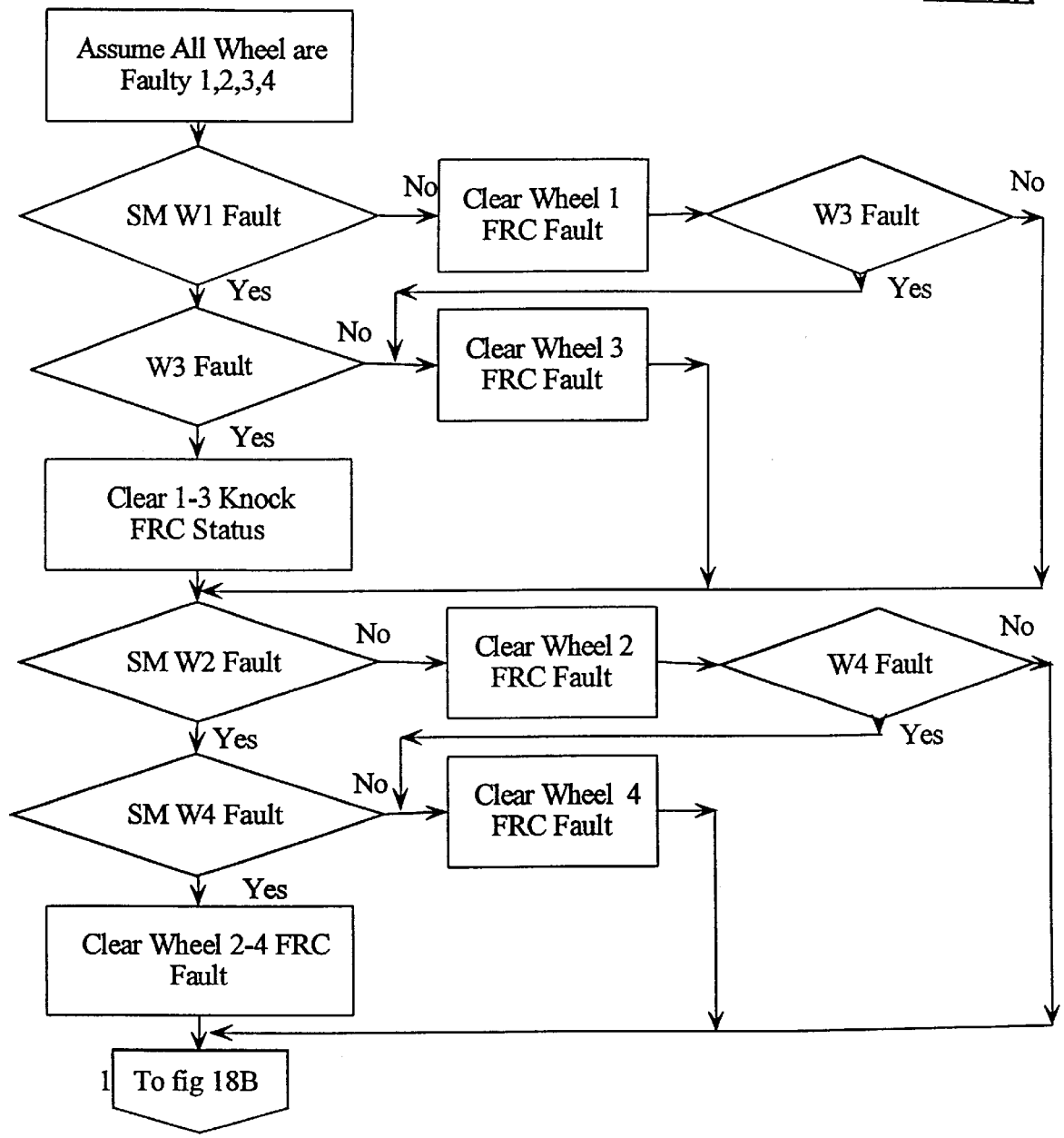
FIG. 18 is a flow chart of the process to check knock on every axle module of FIG. 14.
Figure 18B:
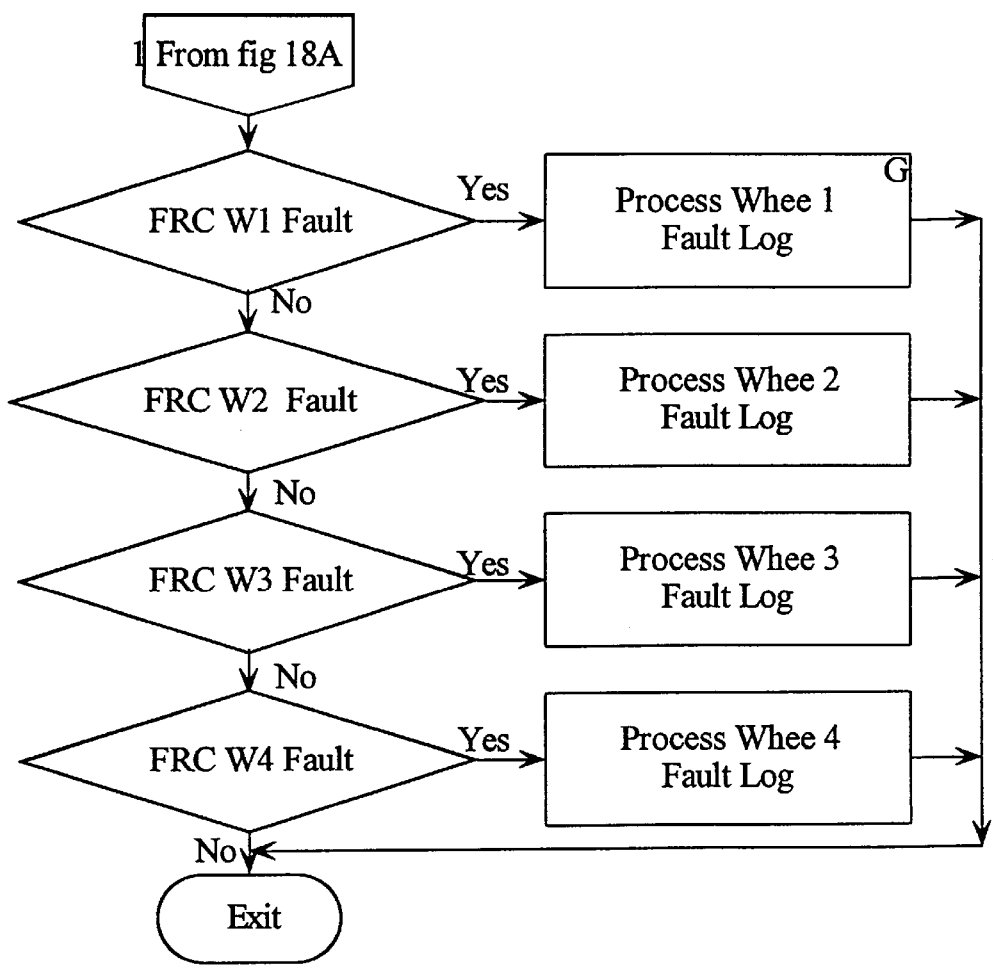
Figure 19A:
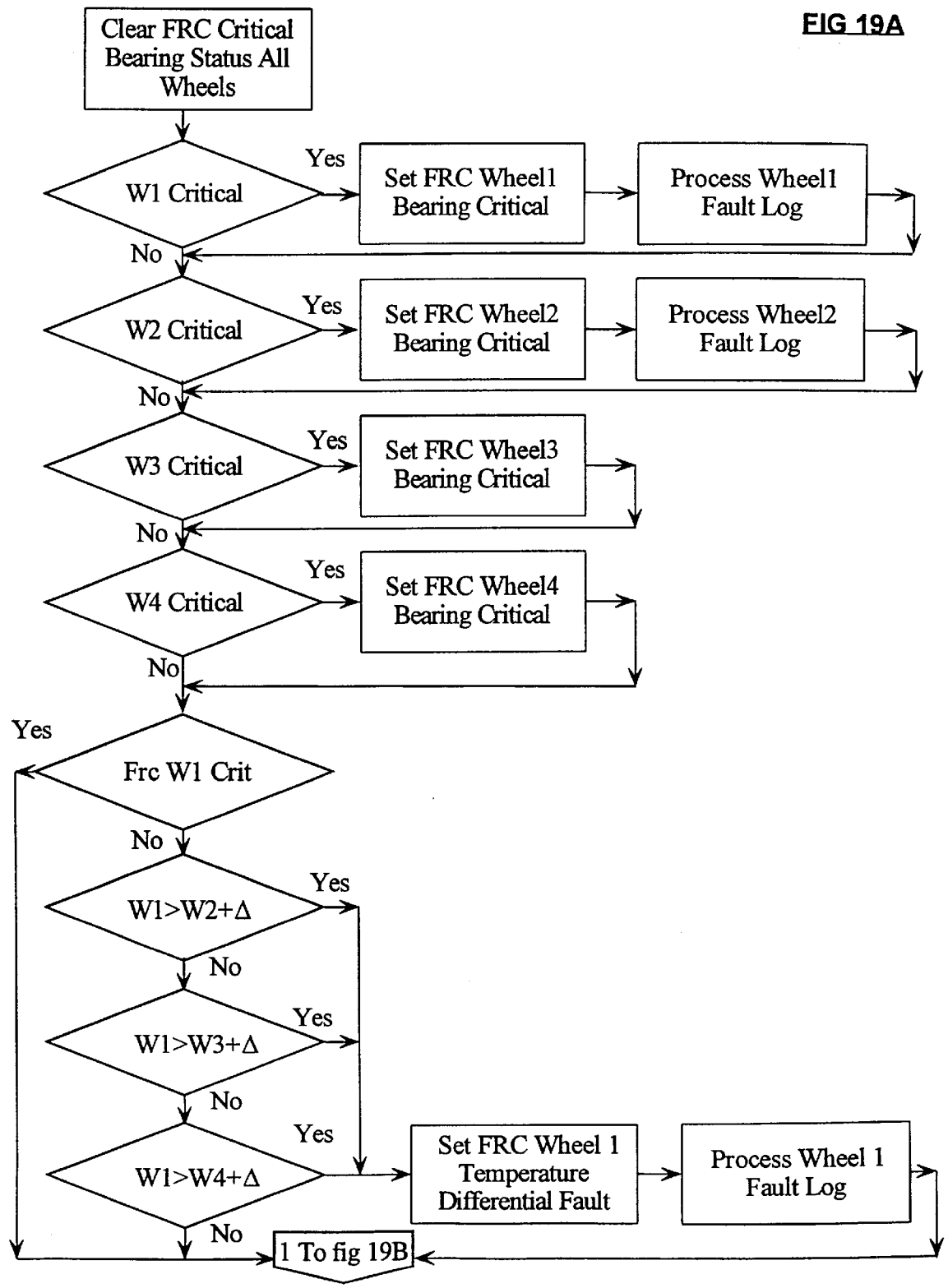
FIG. 19 is a flow chart of the process to check bearing temperature module of FIG. 14.
Figure 19B:
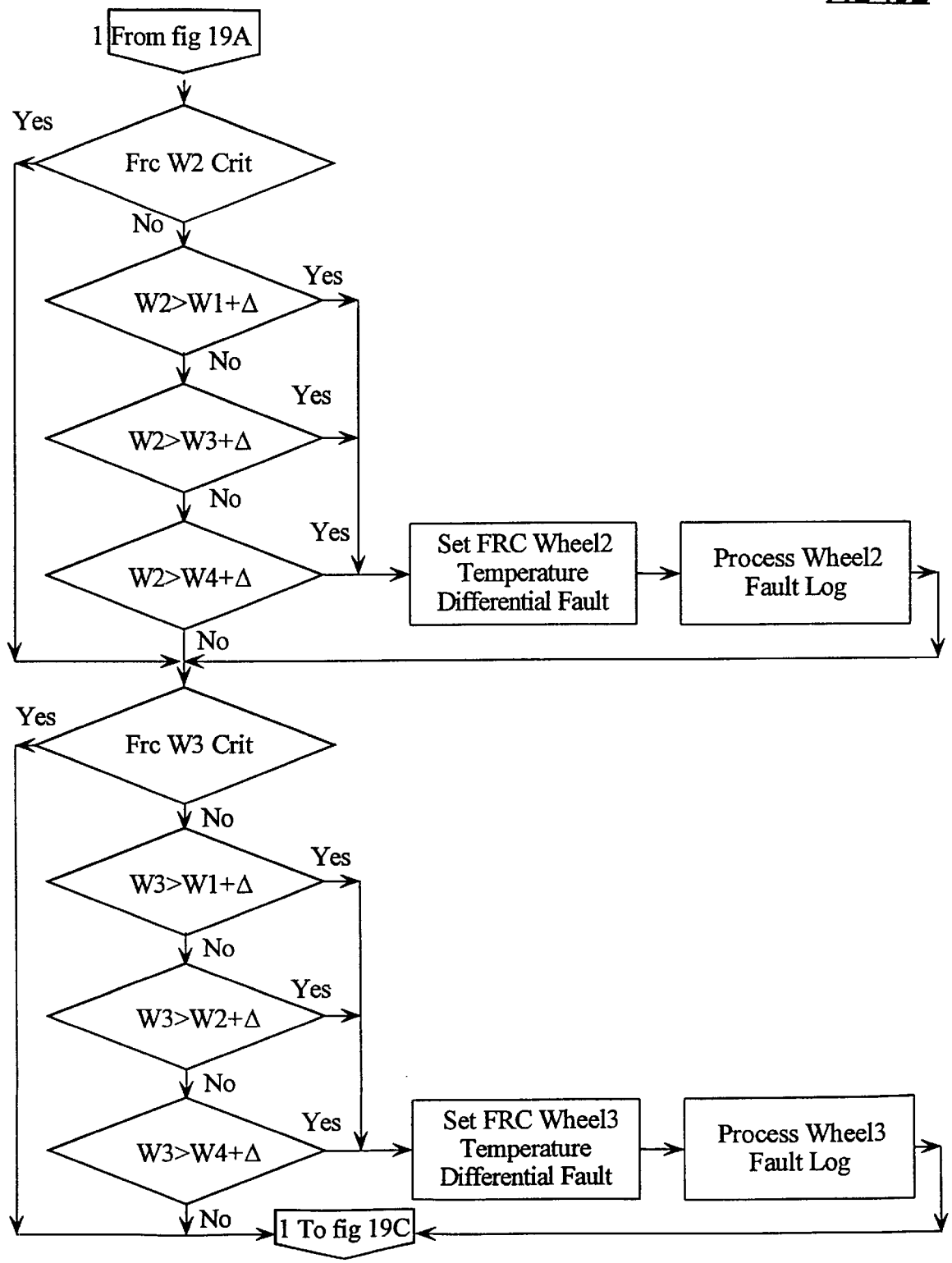
Figure 20:
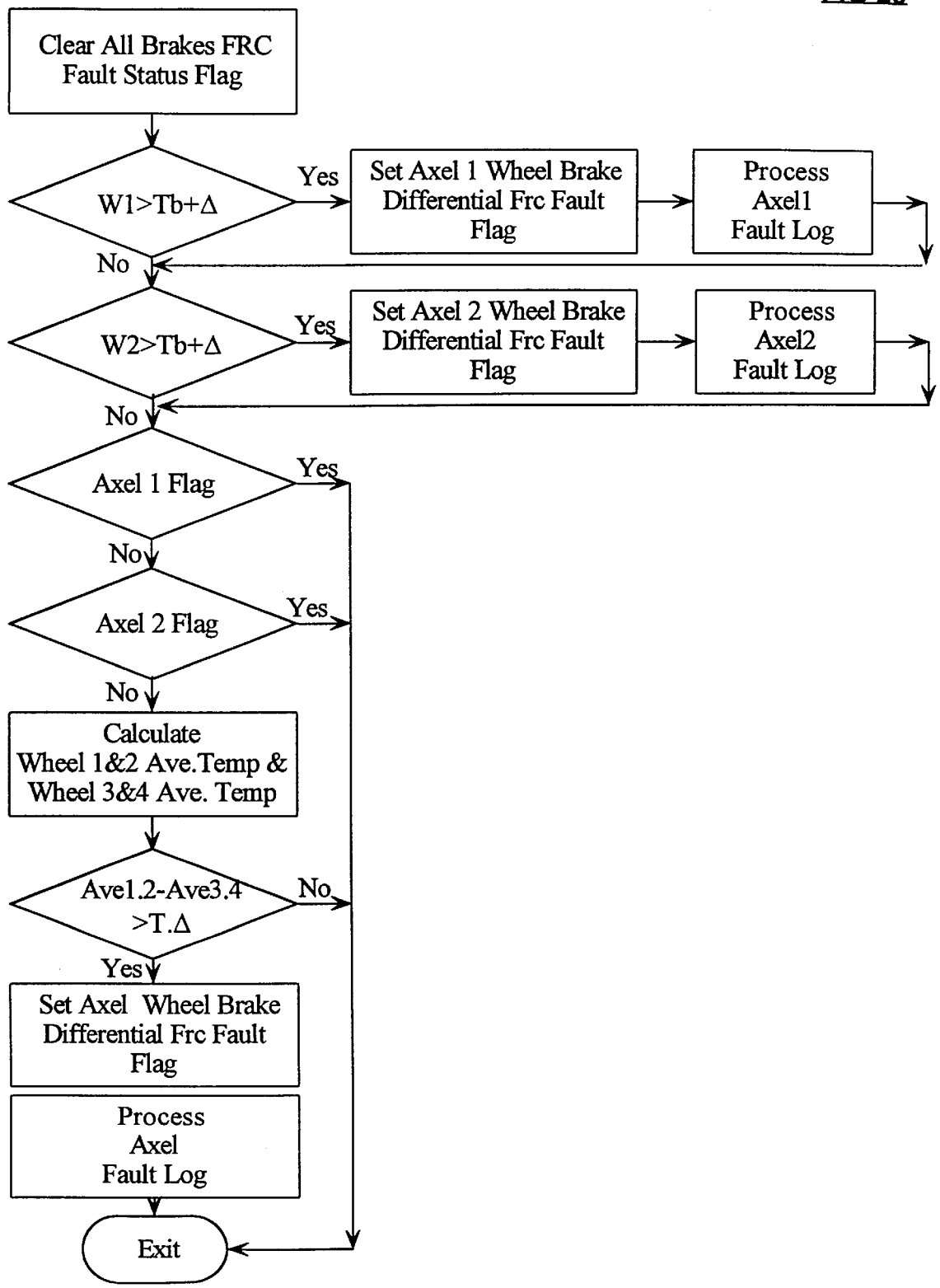
FIG. 20 is a flow chart to check brake differential module of FIG. 14.
Figure 21:
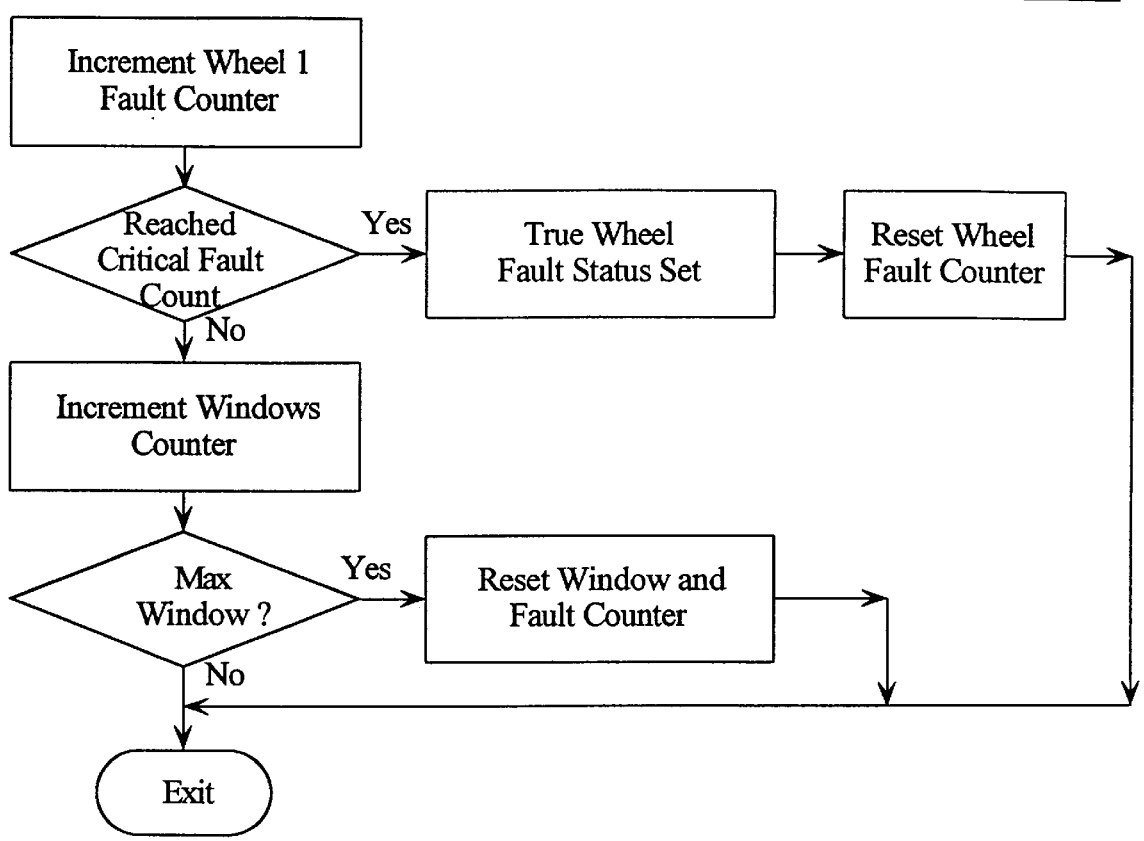
FIG. 21 is a flow chart of a process wheel fault log of FIG. 14.
Figure 22:
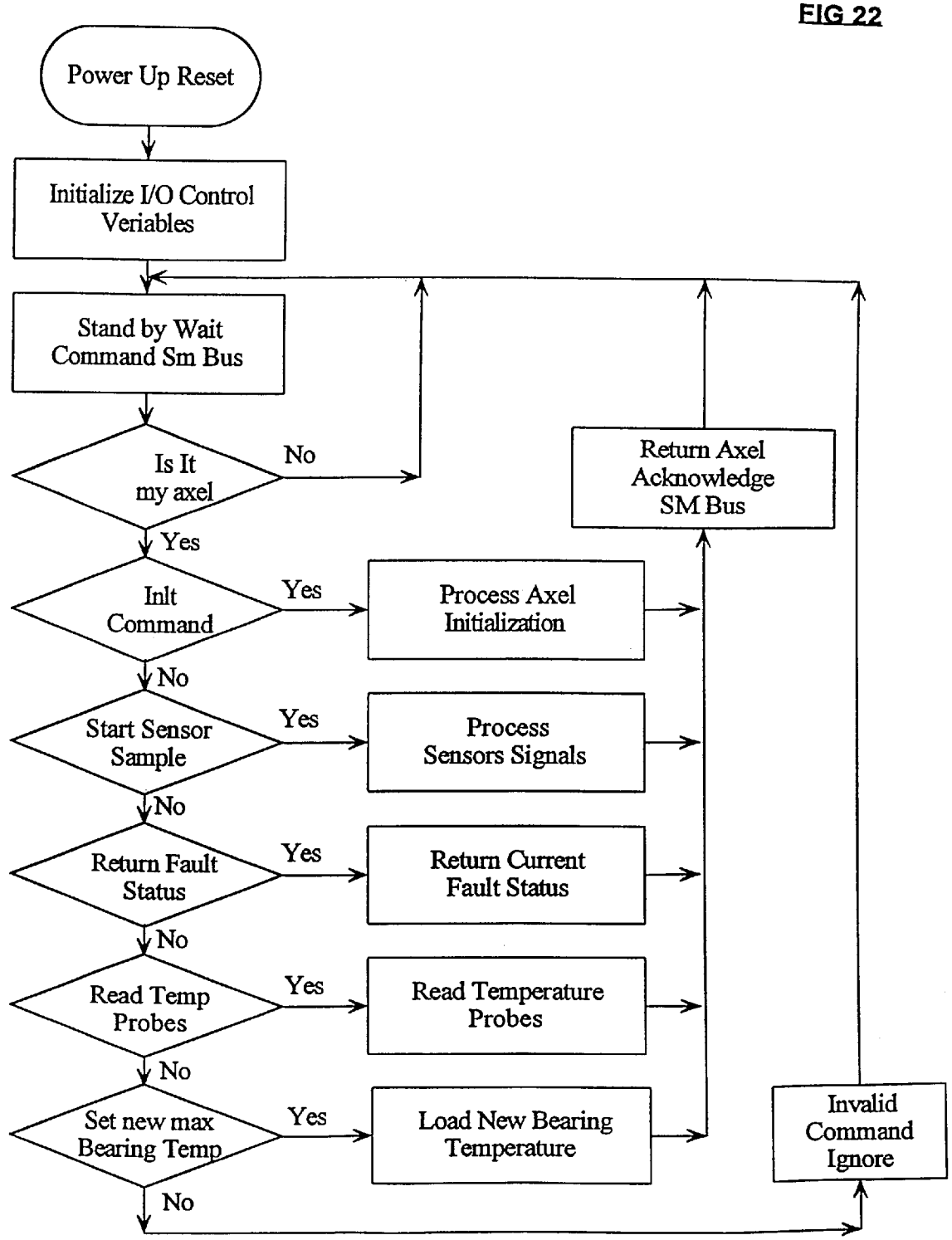
FIG. 22 is a flow chart of the sensor module flow diagram.
Figure 23:
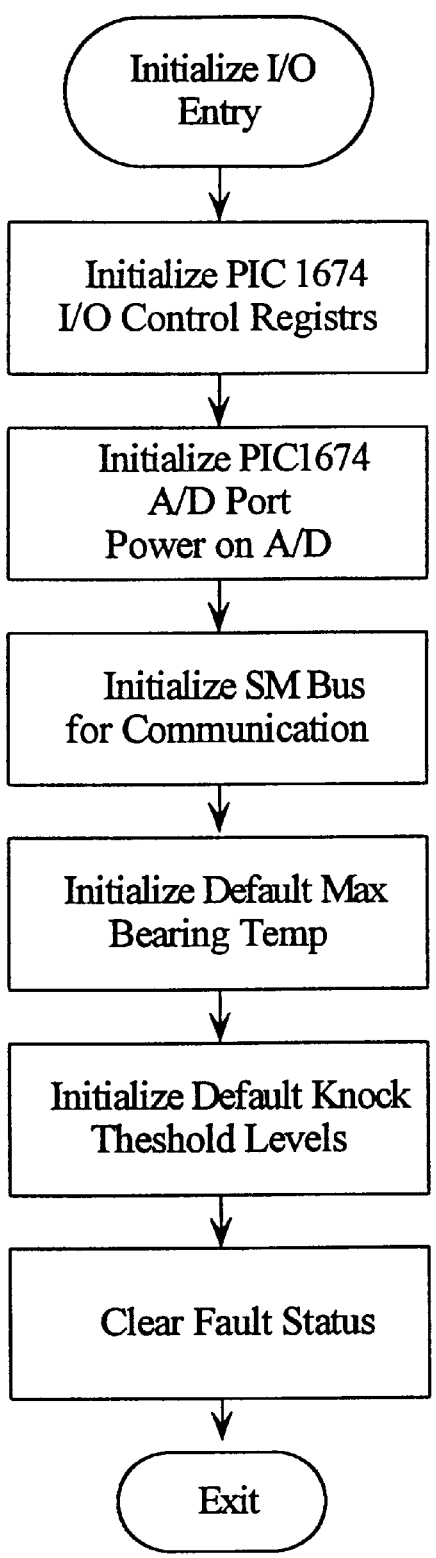
FIG. 23 is a flow chart of the Initialize All I/O and Control Variables module of FIG. 22.
Figure 24:
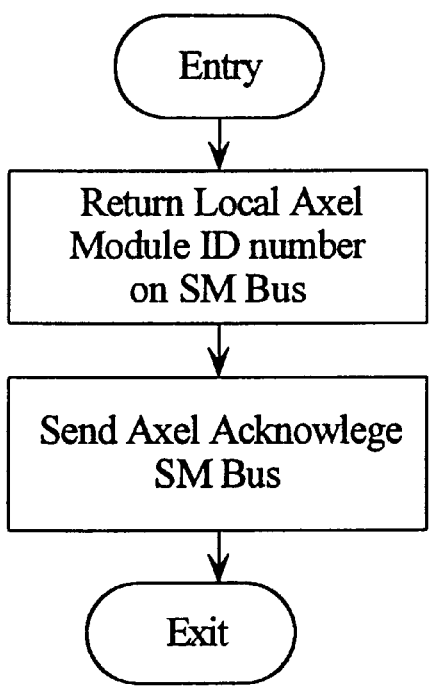
FIG. 24 is a flow chart of the Initialize Command module of FIG. 22.
Figure 25:
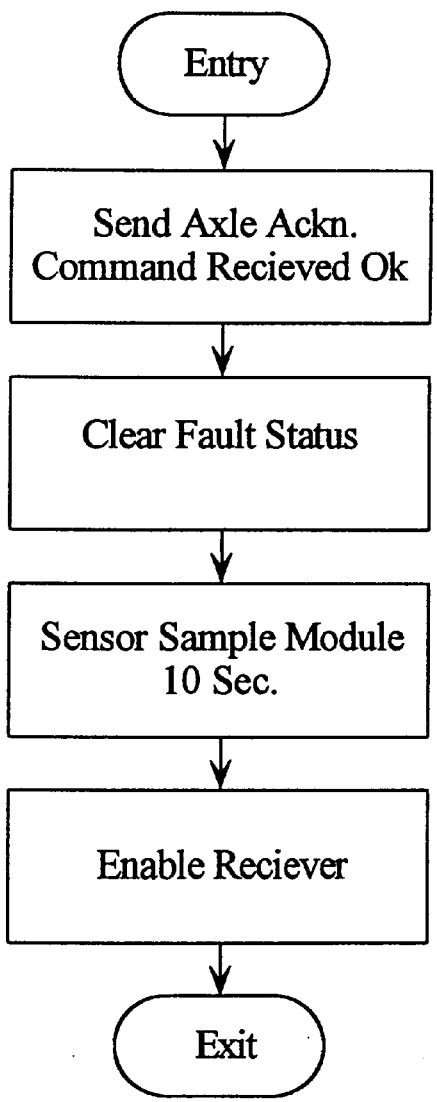
FIG. 25 is a flow chart of the Process Sensor Signal Command Module of FIG. 22.
Figure 26A:
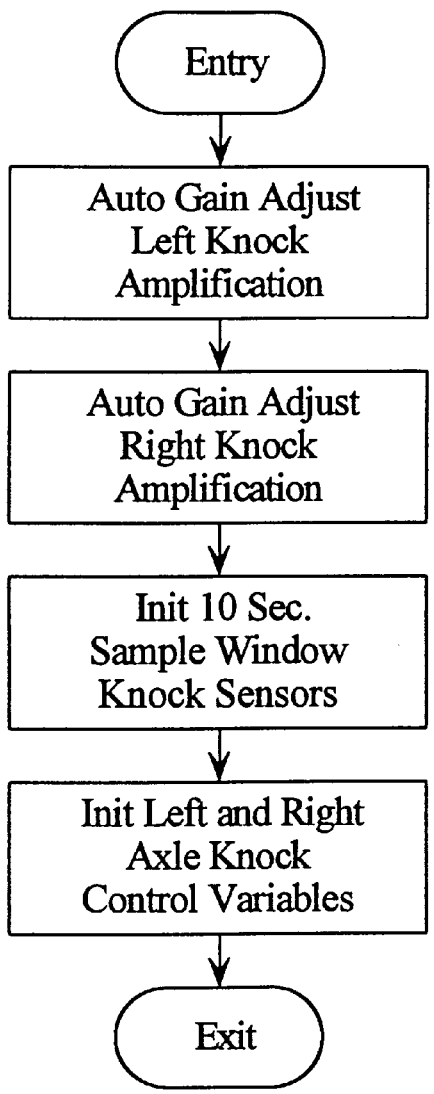
FIG. 26 is a flow chart of the Sensor Sample Module of FIG. 22.
Figure 26B:
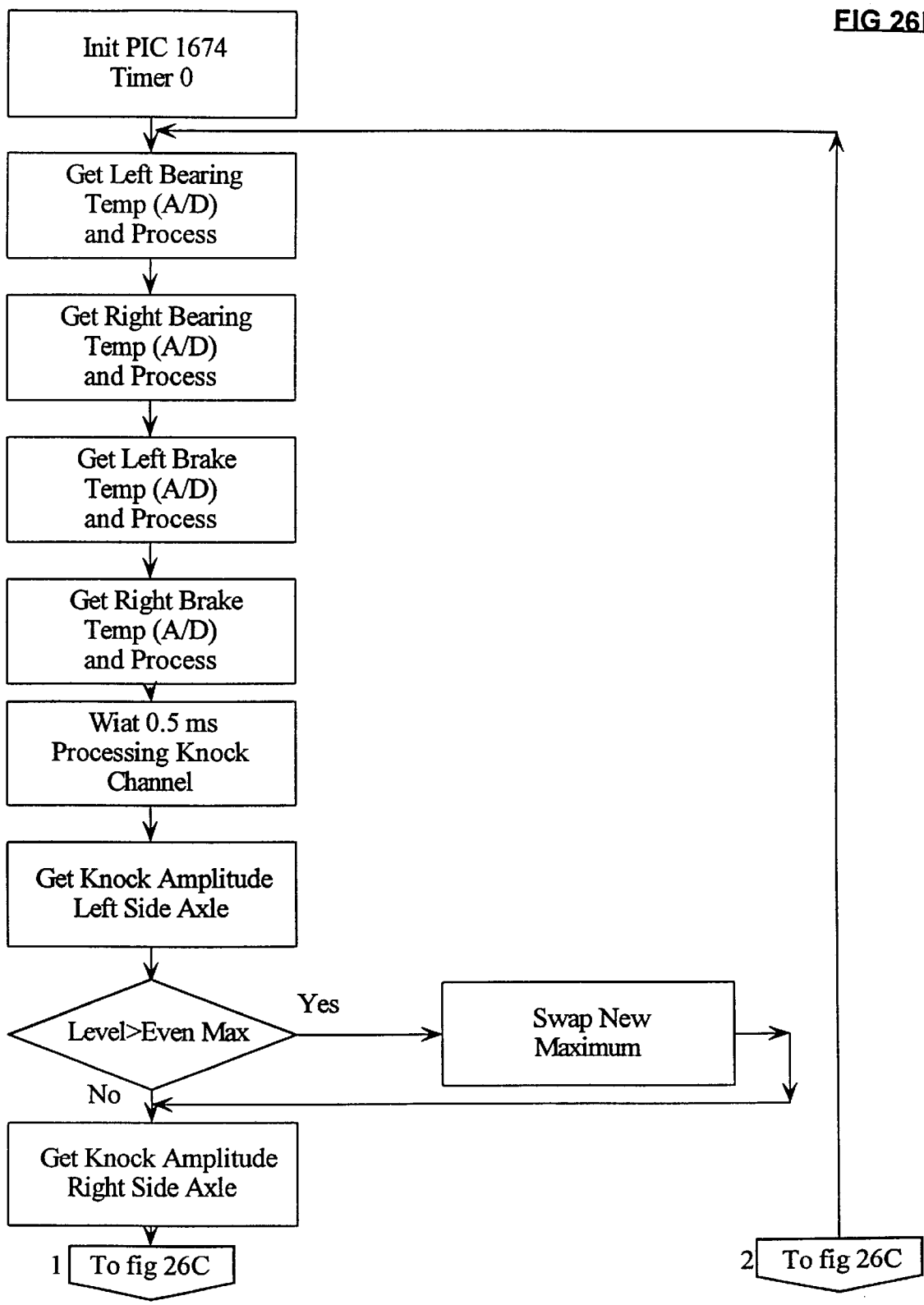
Figure 26C:
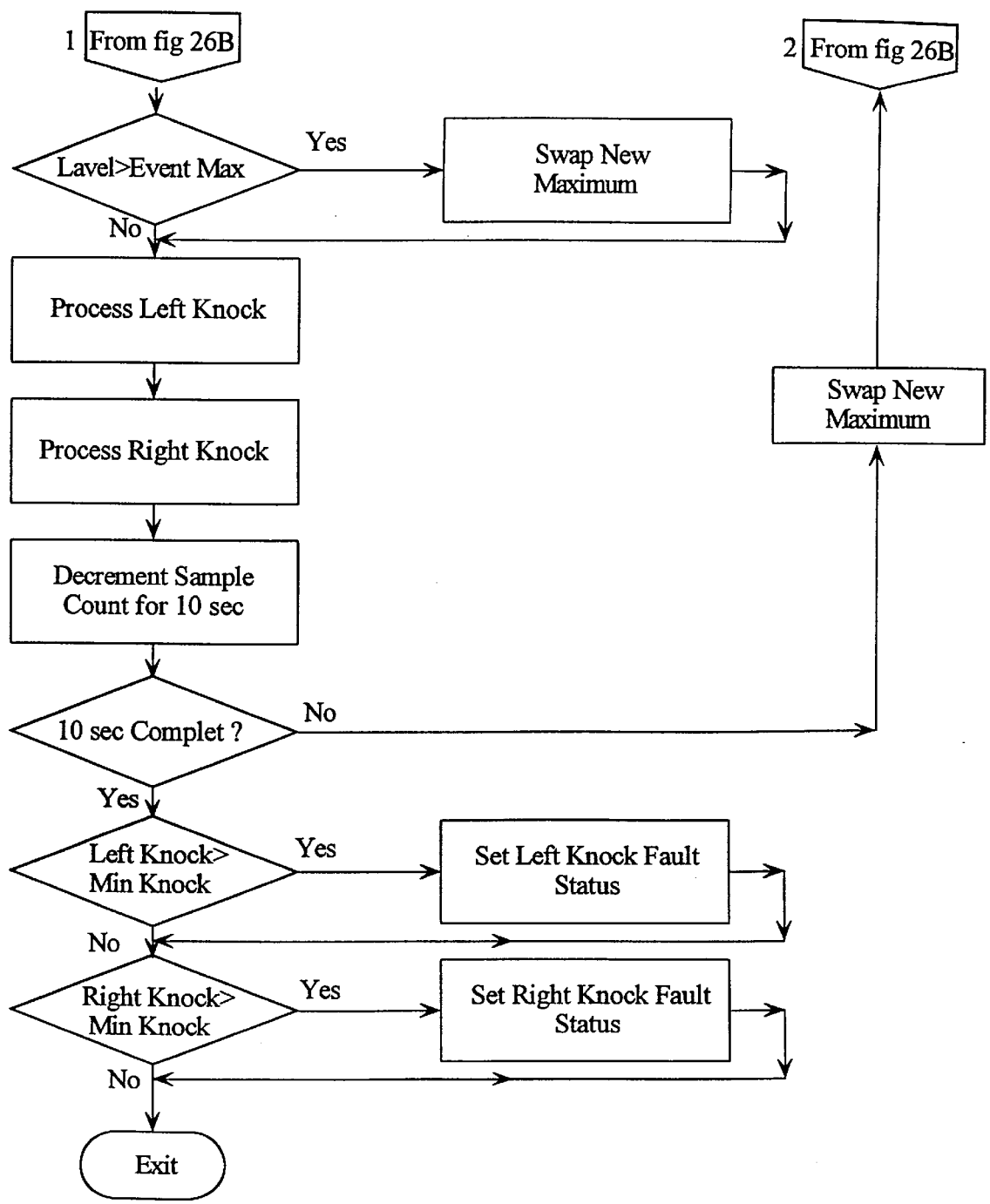
Figure 27A:
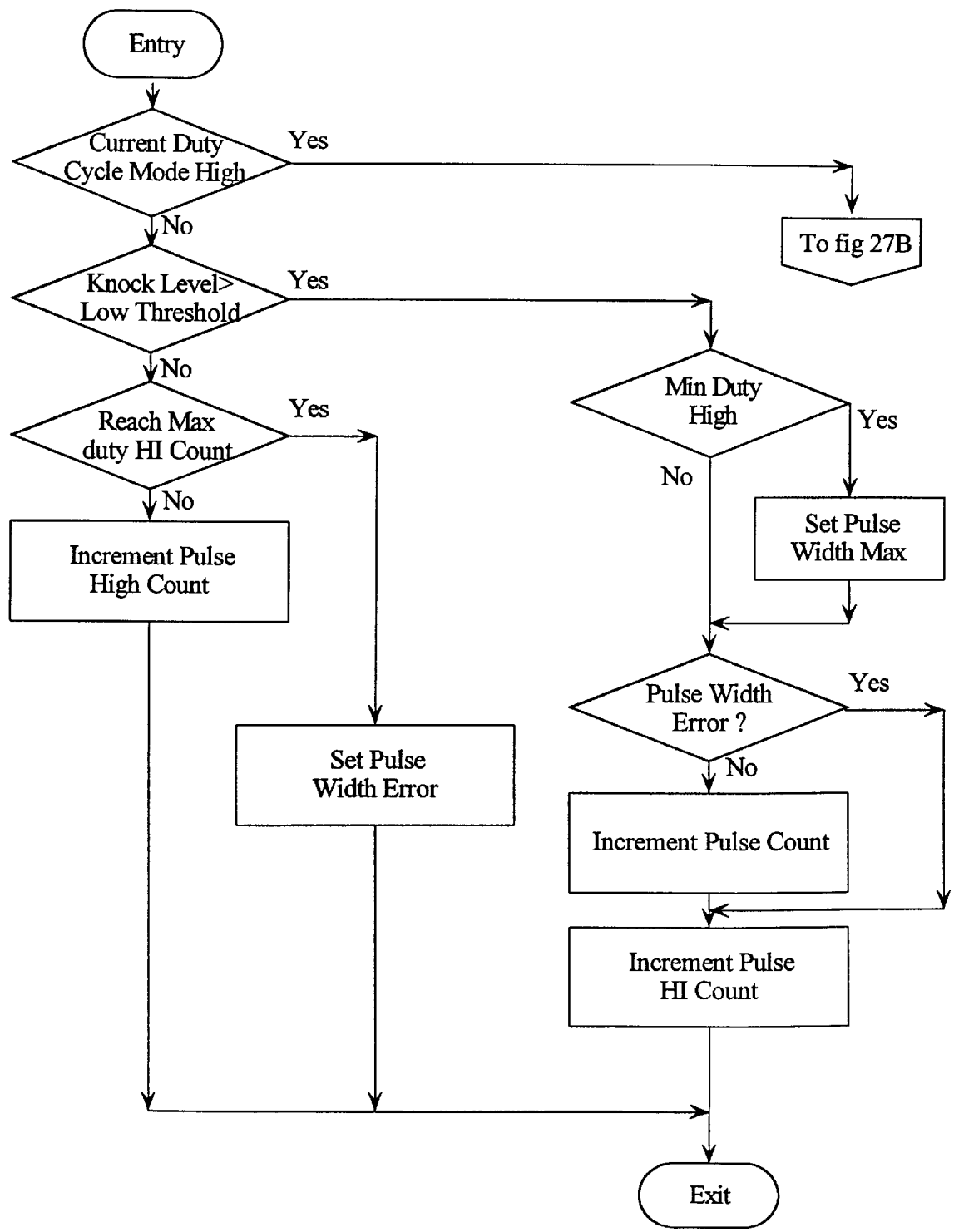
FIG. 27 is a flow chart of the Process Left/Right Knock Channels Module of FIG. 22.
Figure 27B:
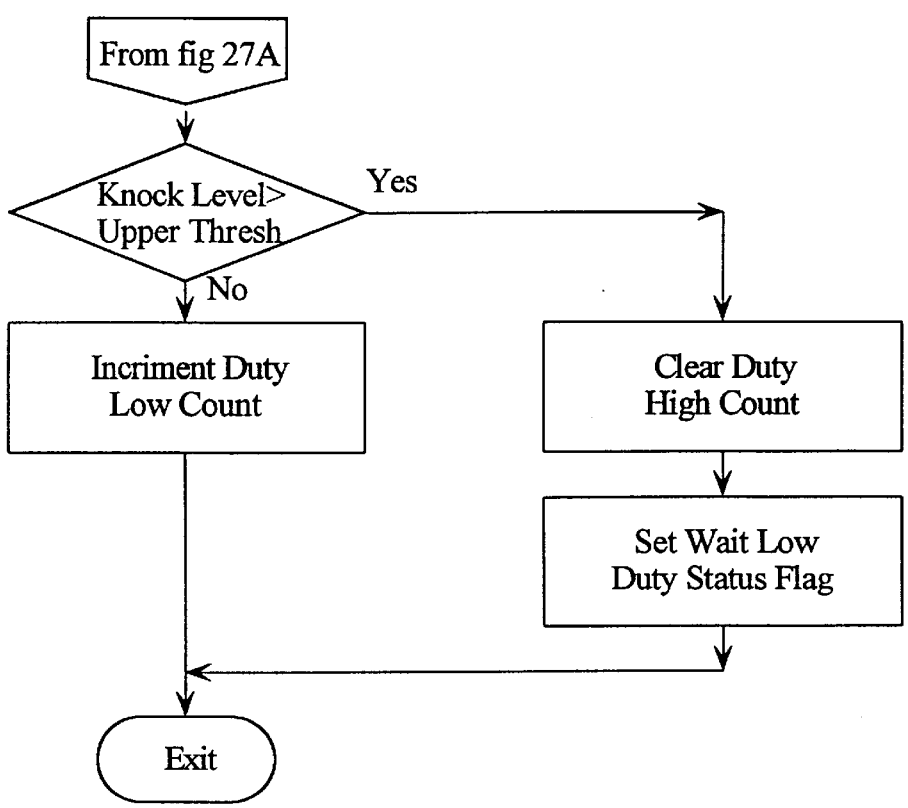
Figure 28A:
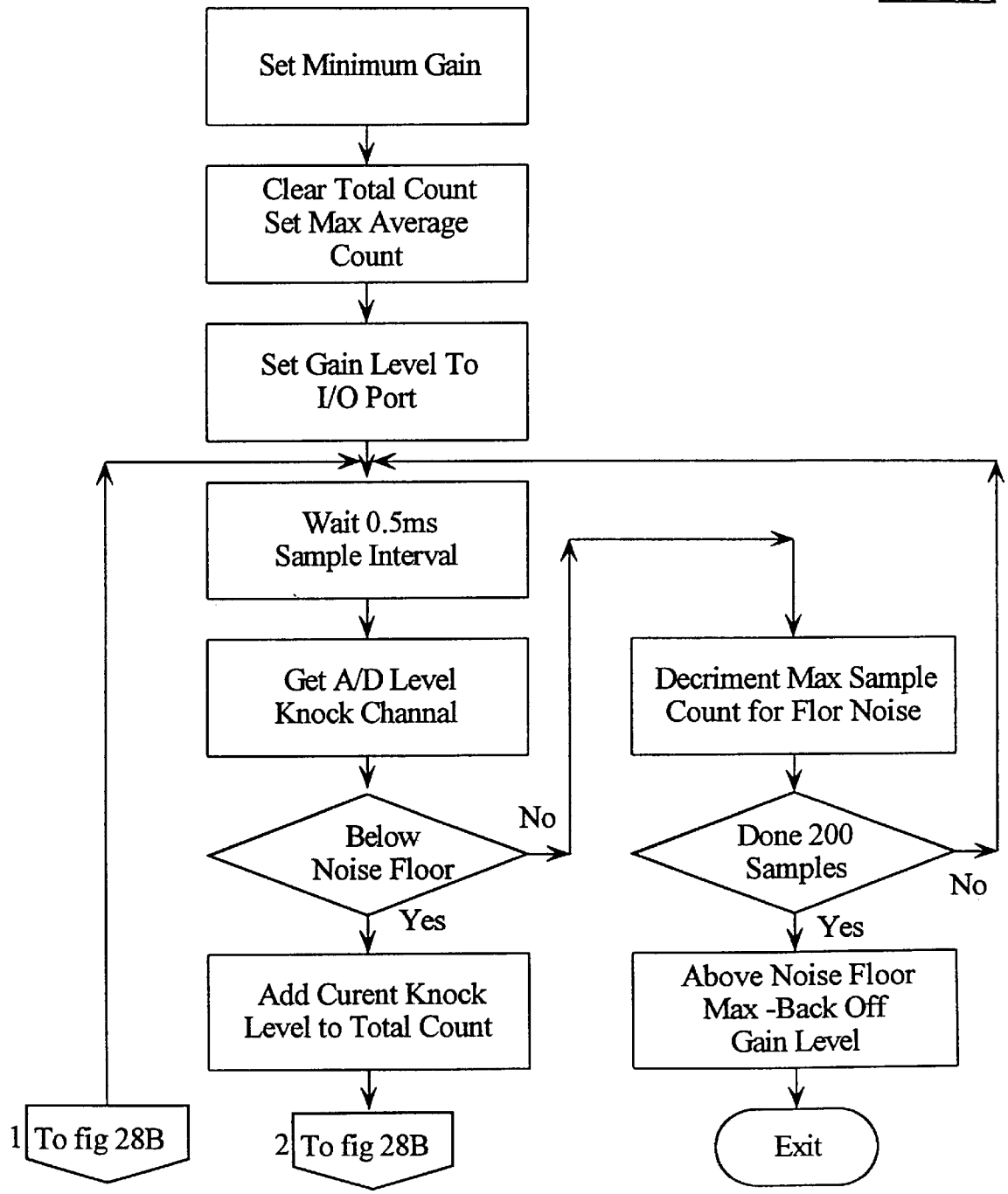
FIG. 28 is a flow chart of the Auto Gain Module of FIG. 22.
Figure 28B:
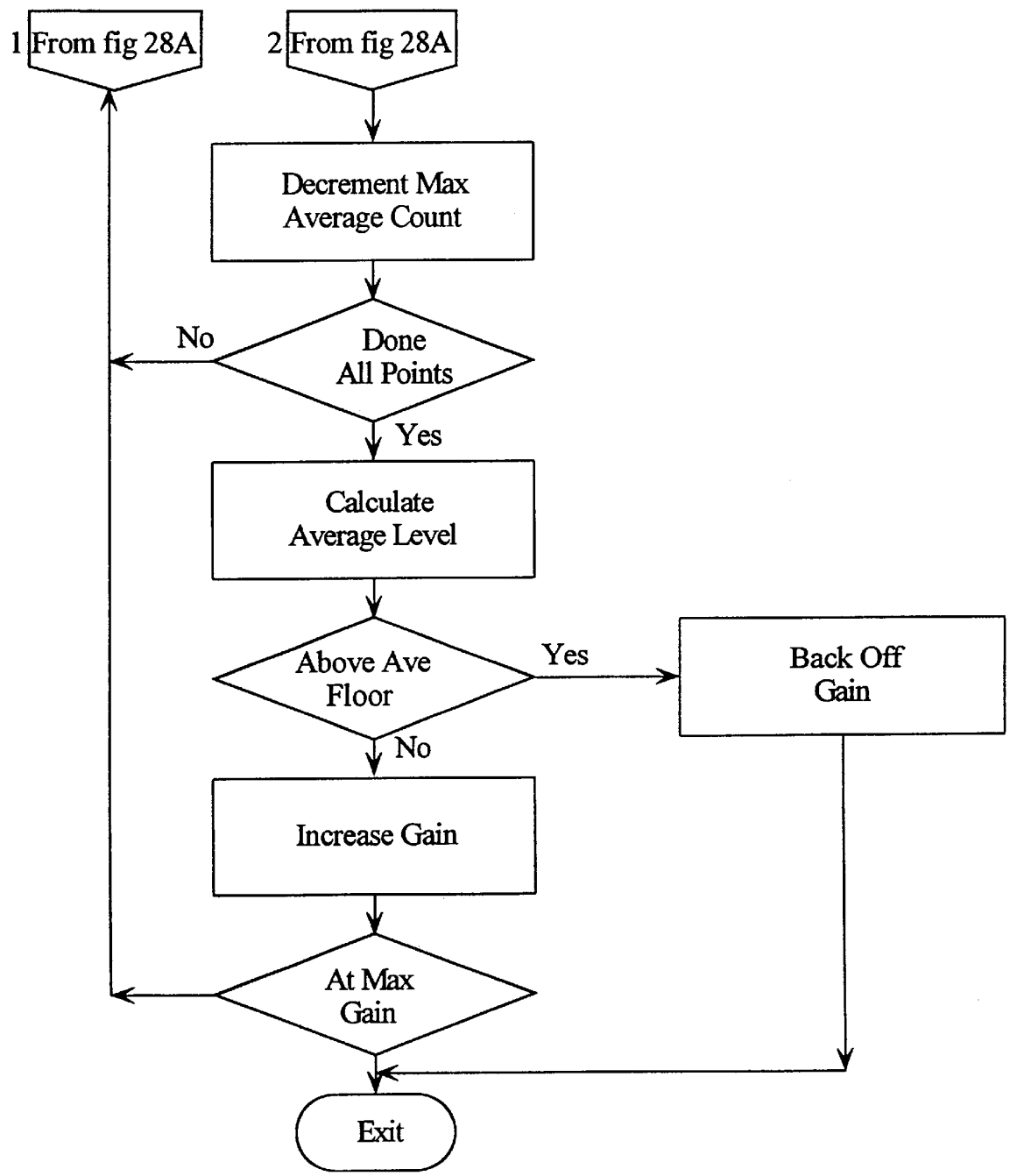

Command Library:

0—Initialize
1—Identify Fault
2—Load New Ambient Temp
3—Return Left Bearing Temp
4—Return Right Bearing Temp
5—Return Left Brake Temp
6—Return Right Brake Temp
7—Return Left Vibration Amplitude
8—Return Right Vibration Amplitude
9—Return Left Wheel RPM
10—Return Right Wheel RPM Initialize As illustrated in FIGS. 8, 9 and 10, the FRC will send out an initialize command to determine how many axle SMC's are connected to it. Each SMC during the initialization phase will transmit its Identification Number as acknowledgment to the FRC.

Identify fault

During road operation, as shown in FIGS. 14 to 21, the FRC will continuously poll all SMC's and request that they inform of any faults present. The SMC will return the following data stream.

[Axle Number] [Fault Code] [:]

0—no fault
1—Temp bearing fault left
2—Temp bearing fault right
3—Brake fault

4—Knock fault left
5—Knock fault right
6—Grind fault left
7—Grind fault right

If a SMC does not respond within a fixed amount of time, a retry is done, if still a failed response, a SMC failure fault is logged and sent to the cab FRC to alert driver.

Load New Ambient

This command will transfer to the selected SMC the current ambient temperature for use in fault condition tests. The temperature number is sent in the parameter byte.

The following SMC commands are used for diagnostics and during install setup to verify the selected sensor is operating.

Return Left Bearing Temp

This command will return the current temperature for the left bearing on the axle.

Return Right Bearing Temp

This command will return the current temperature for the right bearing on the axle.

Return Left Brake Temp

This command will return the current temperature for the left brake on the axle.

Return Right Bearing Temp

This command will return the current temperature for the right break on the axle.

Return Left Vibration Amplitude

This command will return the current vibration amplitude for the left wheel on the axle.

Return Right Vibration Amplitude

This command will return the current vibration amplitude for the right wheel on the axle.

Return Left Wheel RPM

This command will return the current revolution speed of the left wheel to test the wheel lock position indicator.

Return Right Wheel RPM

This command will return the current revolution speed of the right wheel to test the wheel lock position indicator.

Each FRC 32, 33, 40 as shown in FIG. 7 uses a microcontroller 14. preferably a PICI6C74 microcontroller, as the center communication hub between the Cab/Trailers FRCs, SMCs and Interrogation Terminals. Each FRC is equipped with al Silicon Hardware ID Code 105 for module identification. This identification number will be tagged with a Vehicle identification number during installation which will be stored in EEProm 84. Each FRC will have a 64×8 bit Serial EEProm 84 for logging fault error codes, with a capacity of 1000 fault records before recycling and removing old readings. Each FRC connects to three interface buses, MXBUS 38, SMBUS 39 and the ITGBUS 87. The FRC in the cab will also have a display 79, keyboard 106 and audio alarm system interface 107 with additional firmware to support this interface.

Fault Recording Module Design (FIGS. 8 to 21) can be broken down into 4 basic areas.

Fault Recording Data Format
   MXBus System Protocol
   SMBus System Protocol (described earlier in SMC description)
   ITGBus System Protocol Fault Recording Data Format: Every fault that is verified by the FRC is stored in EEProm, in a 1000 fault circular buffer. When the buffer reaches maximum capacity, the oldest records are removed when new ones are added. Each fault is packed in a group of 8 data bytes as follows.

| Byte 0 | Year |
| Byte 1 | Month |
| Byte 2 | Day |
| Byte 3 | Hr |
| Byte 4 | Min |
| Byte 5 | Fault Id |
| Byte 6 | Driver Acknowledged Status |
| Byte 7 | Reserved |

MXBUS Protocol: All FRC's communicate with each other on the MXBUS. The Cab FRC is the System Host and controls all data transfers on the MXBUS. The Cab FRC is responsible for identifying all FRC's connected to the MXBUS. This is done by sending out an identify command during the initialization process. Trailers will be identified by the T suffix and Pup trailers will be identified by the P suffix and Cabs identified by the C suffix. During the install setup each FRC is programmed with its appropriate suffix. During the Initialization process, the cab CPU will start in sequence and ask for the identification number of all Trailers/Pups, and to report how many axles each controls. In the special case of a multiple trailer hookup, the cab CPU will assign one of the trailers a new ID code for communication on the MXBUS. Every Trailer will have a name plate attached to it during install setup, for easy identification of a trailer fault for multi-trailer configuration. To avoid data collisions in a multi-trailer hookup (ie 2 T suffixes), a random time response seed table will be programmed into each FRC's EEProm, so that if a transfer is not successful on first pass, it will delay a random amount of time and try again till communication is established and a valid ID number has been assigned.

The Cab FRC will continuously poll all FRC's in the system to ask if any faults are present. If a fault is indicated the Cab FRC will then inform the driver with all audio alarm, a visual message displaying the fault detected on the LCD display panels.

| ie | ID | AXLE | SIDE | FAULT |
|---|---|---|---|---|
| | T | 01 | LEFT | BEARING |
| | C | 03 | LEFT | BRAKE |
| | P | 02 | RIGHT | KNOCK |

Note: On multi-trailer hookups, the ID would display the FRC ID number which wold match the name plate on the trailer.

The driver would then press an acknowledge key to clear the error code after inspection, and the alarm will turn off. It the same fault is indicated again, the alarm will sound again, after the third time the alarm will be disabled and only a visual message will be displayed.

The acknowledge data byte in the fault data record will keep track of the number of responses by the driver to the same fault.

The CAB FRC will use a multi byte command structure for communicating on the MXBUS. All commands strings are truncated with a:

[Trailer ID] [Command] [Parameter] [:]

Trailer ID specifies which trailer should talk. Command specifies what function the trailer should execute. The Parameter string contains any additional data.

Command Library

| 0 | Initialize | [trailer FRC should return its internal FRC ID number] |
|---|---|---|
| 1 | ID Acknowledge | [ID has been verified] |
| 3 | Report Axle Count | [trailer should respond with the axle count] |
| 2 | Identify fault | [Ask for any Faults detected, same as SMC fault codes] |
| 3 | Time Record Fault | [Time transfer to Trailer FRC for fault record] |

ITGBUS Protocol: The ITGBUS is a standard RS232C interface to allow all the EEPROM data in the FRC to be interrogated and to allow for remote operation of the FRC unit. This can be done using a specially designed hand held unit, or any IBM computer terminal.

Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiments of the invention in which an exclusive property or privilege is claimed are defined as follows:

1. A monitoring system for detecting problems associated with the wheels on vehicle axles comprising one or more sensors located on the vehicle axles adjacent the wheels, a programmable micro processor for receiving and processing the sensor signals to detect an alarm condition and alarm means to alert the driver of a problem with one or more of the wheels wherein said sensors detect heat, noise and/or vibration.

2. Apparatus according to claim 1 wherein said sensors are located within the wheel hub and brake pads.

3. Apparatus according to claim 2 wherein said micro processor monitors changes in the heat, noise and vibration detected by the sensors and determines when an alarm condition exists.

4. Apparatus according to claim 3 wherein the alarm means comprises a micro processor annunciator capable of giving an audio, visual alarm to alert the operator an alarm condition exists.

5. A system according to claim 1 wherein each sensor includes a temperature transducer located on each axle adjacent the wheels to monitor the temperature of the bearings of the wheels at the end of each axle.

6. A system according to claim 5 wherein each sensor includes a second temperature transducer located remote from said temperature transducer adjacent the brakes to monitor any changes in the temperature of the brakes.

7. A system according to claim 6 wherein each sensor includes a vibration transducer for monitoring noise, vibration and knocking.

8. A system according to claim 7 wherein the first temperature transducer and the vibration transducer are sealed in a housing.

9. A system according to claim 8 consisting of a networked microcontroller based system for monitoring and recording operating axle faults for a multi axle vehicle where each of the axles on the vehicle has wheels and brakes at both ends of said axles, said system comprising sensors capable of monitoring heat, noise, vibration and shocks associated with said axles, brakes and wheels mounted on each axle, one or more sensor CPUs connected to the sensors monitoring the axles and wheels and brakes, a fault recording CPU connected to said sensor CPUs, said fault recording CPU having a keypad and display for system initialization and a fault warning means.

10. A networked microcontroller based system according to claim 9 for monitoring and recording operating axle faults for a heavy vehicle cab and trailer hookup, where said cab has at least two cab axles with wheels and brakes at both ends of said cab axles and said trailer has one or more trailer axles with wheels and brakes at both ends of said trailer axles, comprising sensors capable of monitoring heat, noise, vibration and shocks associated with said axles, brakes and wheels mounted on each cab axle and each trailer axle, one or more cab sensor CPUs connected to the sensors monitoring the cab axles and wheels and brakes, one or more trailer sensor CPUs connected to the sensors monitoring the trailer axles and wheels and brakes, a cab fault recording CPU connected to said cab sensor CPUs, a trailer fault recording CPU connected to said trailer sensor CPUs, said cab fault recording CPU having a keypad and display for system initialization and a fault warning and means to permit the cab fault recording CPU and trailer fault recording CPU to communicate with each other.

11. A system according to claim 10 wherein the cab fault recording CPU and the trailer fault recording CPU are equipped with an interrogation interface for connection to another computer.

12. A system according to claim 10 wherein when the temperature of the bearings of a wheel exceeds ambient air temperature by a selected amount a fault warning is displayed on the fault recording CPU.

13. A system according to claim 12 wherein when the difference between the brakes on one end of an axle exceeds the temperature of the brakes on the other end of the same axle exceeds a selected amount a fault warning is displayed on the fault recording CPU.

14. A system according to claim 13 wherein the fault recording CPUs compare the temperature of the bearings on each axle to the temperature of the bearings on every other axle before indicating a fault.

15. A system according to claim 10 wherein the means to permit the cab fault recording CPU and trailer fault recording CPU to communicate with each other consists of a multiplex bus.

16. A system according to claim 15 wherein the multiplex bus uses a free turn signal lamp wire for transmitting and receiving data.

17. A system according to claim 15 wherein the fault recording CPU is programable to control one or more auxilary functions selected from the group consisting of in-cab warning lights in response to a signal from the trailer to the cab if there is an antilocking brake system (ABS) malfunction on the trailer, lift axle operation, rear door locks, emergency stop warning lights on the trailer, tail gates, hoppers, valves and chutes, back up lights and horn on the trailer, drive shaft overheating, brake adjustment on the trailer, brake pad wear, trailer refridgeration units, load shift or weight of the trailer and the like.

18. A system according to claim 15 wherein the sensor module CPU is programmed to determine if there is a cyclic pattern to any knock detected by measuring the time between pulses and the fault recording CPU checks the other axles before signaling a fault.

19. A system according to claim 18 wherein detection of a continuous high amplitude noise signal will generate a fault.

20. A networked microcontroller based system for monitoring and recording operating axle faults for a multi axle vehicle where each of the axles on the vehicle has wheels and brakes at both ends of said axles, said system comprising sensors capable of monitoring heat, noise, vibration and shocks associated with said axles, brakes and wheels mounted on each axle, one or more sensor CPUs connected to the sensors monitoring the axles and wheels and brakes, a fault recording CPU connected to said sensor CPUs, said fault recording CPU having a keypad and display for system initialization and a fault warning means.

21. A system according to claim 20 wherein each sensor includes a temperature transducer located on each axle adjacent the wheels to monitor the temperature of the bearings of the wheels at the end of each axle.

22. A system according to claim 21 wherein when the temperature of the bearings of a wheel exceeds ambient air temperature by a selected amount a fault warning is displayed on the fault recording CPU.

23. A system according to claim 21 wherein the fault recording CPUs compare the temperature of the bearings on each axle to the temperature of the bearings on every other axle before indicating a fault.

24. A system according to claim 21 wherein each sensor includes a vibration transducer for monitoring noise, vibration and knocking.

25. A system according to claim 24 wherein the first temperature transducer and the vibration transducer are sealed in a housing.

26. A system according to claim 24 wherein the sensor module CPU is programmed to determine if there is a cyclic pattern to any knock detected by measuring the time between pulses and the fault recording CPU checks the other axles before signaling a fault.

27. A system according to claim 26 wherein detection of a continuous high amplitude noise signal will generate a fault.

28. A networked microcontroller based system for monitoring and recording operating axle faults for a heavy vehicle cab and trailer hookup, where said cab has at least two cab axles with wheels and brakes at both ends of said cab axles and said trailer has one or more trailer axles with wheels and brakes at both ends of said trailer axles, comprising sensors capable of monitoring heat, noise, vibration and shocks associated with said axles, brakes and wheels mounted on each cab axle and each trailer axle, one or more cab sensor CPUs connected to the sensors monitoring the cab axles and wheels and brakes, one or more trailer sensor CPUs connected to the sensors monitoring the trailer axles and wheels and brakes, a cab fault recording CPU connected to said cab sensor CPUs, a trailer fault recording CPU connected to said trailer sensor CPUs, said cab fault recording CPU having a keypad and display for system initialization and a fault warning and means to permit the cab fault recording CPU and trailer fault recording CPU to communicate with each other.

29. A system according to claim 28 wherein the fault recording CPU is programable to control or monitor one or more auxilary functions selected from the group consisting of in-cab warning lights in response to a signal from the trailer to the cab if there is an antilocking brake system (ABS) malfunction on the trailer, lift axle operation, rear door locks, emergency stop warning lights on the trailer, tail gates, hoppers, valves and chutes, back up lights and horn on the trailer, drive shaft overheating, brake adjustment on the trailer, brake pad wear, trailer refridgeration units, load shift or weight of the trailer and the like.

30. A system according to claim 28 wherein the means to permit the cab fault recording CPU and trailer fault recording CPU to communicate with each other consists of a multiplex bus.

31. A system according to claim 30 wherein the multiplex bus uses one of the circuits on the standard seven pin connection between the cab and trailer for transmitting and receiving data.

32. A system according to claim 31 wherein the multiplex bus uses a free turn signal lamp wire for transmitting and receiving data.

33. A system according to claim 28 wherein the cab fault recording CPU and the trailer fault recording CPU are equipped with an interrogation interface for connection to another computer.

34. A system according to claim 33 wherein each sensor includes a second temperature transducer located remote from said temperature transducer adjacent the brakes to monitor any changes in the temperature of the brakes.

35. A system according to claim 34 wherein when the difference between the brakes on one end of an axle exceeds the temperature of the brakes on the other end of the same axle exceeds a selected amount a fault warning is displayed on the fault recording CPU.

36. A communication system for tractor trailers comprising a cab CPU incorporating a transmitter/receiver and a trailer CPU incorporating a transmitter receiver wherein said cab CPU and said trailer CPU communicate with each other on a multiplex bus.

37. A communication system according to claim 36 wherein the multiplex bus uses a free turn signal lamp wire for transmitting and receiving data.

38. A communication system according to claim 36 wherein the cab CPU is programmable to control or monitor one or more auxilary functions on said trailer selected from the group consisting of in-cab warning lights in response to a signal from the trailer to the cab if there is an antilocking brake system (ABS) malfunction on the trailer, lift axle operation, rear door locks, emergency stop warning lights on the trailer, tail gates, hoppers, valves and chutes, back up lights and horn on the trailer, drive shaft overheating, brake adjustment on the trailer, brake pad wear, trailer refridgeration units, load shift or weight of the trailer and the like.

* * * * *